US012699252B2

(12) United States Patent
Hsueh et al.

(10) Patent No.: US 12,699,252 B2
(45) Date of Patent: Aug. 4, 2026

(54) OPTICAL IMAGING LENS ASSEMBLY, IMAGING APPARATUS AND ELECTRONIC DEVICE

(71) Applicant: LARGAN PRECISION CO., LTD., Taichung (TW)

(72) Inventors: Chun-Che Hsueh, Taichung (TW); Tzu-Chieh Kuo, Taichung (TW)

(73) Assignee: LARGAN PRECISION CO., LTD., Taichung (TW)

( * ) Notice: Subject to any disclaimer, the term of this patent is extended or adjusted under 35 U.S.C. 154(b) by 338 days.

(21) Appl. No.: 18/595,576

(22) Filed: Mar. 5, 2024

(65) Prior Publication Data

US 2025/0147274 A1 May 8, 2025

(30) Foreign Application Priority Data

Nov. 2, 2023 (TW) .................................. 112142144

(51) Int. Cl.
*G02B 9/60* (2006.01)
*G02B 13/18* (2006.01)

(52) U.S. Cl.
CPC .............. *G02B 9/60* (2013.01); *G02B 13/18* (2013.01)

(58) Field of Classification Search
CPC .................................. G02B 9/60; G02B 13/18
USPC ......................................................... 359/714
See application file for complete search history.

(56) References Cited

U.S. PATENT DOCUMENTS 4,787,721 A 11/1988 Fukushima et al.
2011/0157724 A1 6/2011 Baba 2013/0100541 A1 4/2013 Huang et al.
2016/0170176 A1 6/2016 Liao et al.
2016/0170177 A1 6/2016 Tang et al.
2016/0170178 A1 6/2016 Tang et al.
2017/0168264 A1 6/2017 Chen et al.
2018/0052301 A1 2/2018 Lai et al.
2018/0052305 A1 2/2018 Lai et al.
2018/0356614 A1 * 12/2018 Hsueh .................. G02B 13/001
2018/0372995 A1 12/2018 Tsai et al.
2019/0293907 A1 9/2019 Emi (Continued)

FOREIGN PATENT DOCUMENTS

CN 105739060 A 7/2016
CN 109085694 A 12/2018

(Continued)

*Primary Examiner* — Bumsuk Won
*Assistant Examiner* — Mitchell T Oestreich
(74) *Attorney, Agent, or Firm* — Troutman Pepper Locke LLP; Tim Tingkang Xia, Esq.

(57) ABSTRACT

An optical imaging lens assembly from an object side to an image side includes a first lens element, a second lens element, a third lens element, a fourth lens element and a fifth lens element. Each of the five lens elements has an object-side surface facing the object side and an image-side surface facing the image side. The image-side surface of the first lens element is concave in a paraxial region thereof. The object-side surface of the fourth lens element is convex in a paraxial region thereof. The object-side surface of the fifth lens element is concave in a paraxial region thereof. At least one of the object-side surface and image-side surface of at least one of the first through fifth lens elements has at least one inflection point in an off-axis region thereof. An f-number of the optical imaging lens assembly is Fno, satisfying 1.5<Fno<2.0.

25 Claims, 20 Drawing Sheets

(56)　　　　　　References Cited

U.S. PATENT DOCUMENTS

| | | |
|---|---|---|
| 2020/0096726 A1 | 3/2020 | Bates |
| 2021/0263287 A1 | 8/2021 | Wenren et al. |
| 2023/0204908 A1 | 6/2023 | Wang et al. |

FOREIGN PATENT DOCUMENTS

| | | | |
|---|---|---|---|
| CN | 109239905 A | 1/2019 |
| CN | 210051955 A | 2/2020 |
| CN | 114355576 A | 4/2022 |
| CN | 116794813 A | 9/2023 |
| CN | 219891479 U | 10/2023 |
| JP | 2010128100 A | 6/2010 |
| JP | 2016045354 A | 4/2016 |
| TW | 201901231 A | 1/2019 |
| WO | 2020237457 A1 | 12/2020 |
| WO | 2023193144 A1 | 10/2023 |

* cited by examiner

OPTICAL IMAGING LENS ASSEMBLY, IMAGING APPARATUS AND ELECTRONIC DEVICE

RELATED APPLICATIONS

This application claims priority to Taiwan Application Serial Number 112142144, filed on Nov. 2, 2023, which is incorporated by reference herein in its entirety.

BACKGROUND

Technical Field

The present disclosure relates to an optical imaging lens assembly and an imaging apparatus, and more particularly, to an optical imaging lens assembly and an imaging apparatus applicable to electronic devices.

Description of Related Art

With the advancement in semiconductor process technology, performances of image sensors have been improved, and pixels have been reduced to even smaller sizes. Therefore, optical lens systems with high image quality have become an indispensable part of modern electronic devices.

Meanwhile, with the rapid development of science and technology, the application range of electronic devices equipped with optical lens systems has become wider, and the requirements for optical lens systems have become more diverse. Since it can be difficult for prior art optical lens systems to achieve a balance among the requirements for image quality, sensitivity, aperture size, system volume, or field of view, the present invention aims to provide an optical lens system to address the needs.

SUMMARY

According to one aspect of the present disclosure, an optical imaging lens assembly comprises five lens elements. The five lens elements in order from an object side to an image side along an optical path are a first lens element, a second lens element, a third lens element, a fourth lens element, and a fifth lens element. Each of the first through fifth lens elements has an object-side surface facing the object side and an image-side surface facing the image side.

Preferably, the first lens element has negative refractive power, the image-side surface of the first lens element is concave in a paraxial region thereof, the object-side surface of the second lens element is convex in a paraxial region thereof, the image-side surface of the third lens element is concave in a paraxial region thereof, the object-side surface of the fourth lens element is convex in a paraxial region thereof, the object-side surface of the fifth lens element is concave in a paraxial region thereof, and at least one of the object-side surface and the image-side surface of at least one of the first through fifth lens elements has at least one inflection point in an off-axis region thereof. Preferably, an f-number of the optical imaging lens assembly is Fno, an Abbe number of the second lens element is V2, an Abbe number of the third lens element is V3, an Abbe number of the fourth lens element is V4, an Abbe number of the fifth lens element is V5, a central thickness of the fourth lens element along the optical path is CT4, an axial distance between the fourth lens element and the fifth lens element is T45, and the following conditions are satisfied:

$$1.5 < Fno < 2.0;$$

$$1.8 < (V2 + V4)/(V3 + V5) < 4.0; \text{ and}$$

$$0.25 < CT4/T45 < 5.5.$$

According to one aspect of the present disclosure, an imaging apparatus comprises the aforementioned optical imaging lens assembly and an image sensor disposed on an image surface of the optical imaging lens assembly.

According to another aspect of the present disclosure, an electronic device comprises the aforementioned imaging apparatuses.

According to one aspect of the present disclosure, an optical imaging lens assembly comprises five lens elements. The five lens elements in order from an object side to an image side along an optical path are a first lens element, a second lens element, a third lens element, a fourth lens element, and a fifth lens element. Each of the first through fifth lens elements has an object-side surface facing the object side and an image-side surface facing the image side.

Preferably, the first lens element has negative refractive power, the image-side surface of the first lens element is concave in a paraxial region thereof, the image-side surface of the third lens element is concave in a paraxial region thereof, the object-side surface of the fourth lens element is convex in a paraxial region thereof, the object-side surface of the fifth lens element is concave in a paraxial region thereof, and at least one of the object-side surface and the image-side surface of at least one of the first through fifth lens elements has at least one inflection point in an off-axis region thereof. Preferably, an f-number of the optical imaging lens assembly is Fno, an Abbe number of the second lens element is V2, an Abbe number of the third lens element is V3, an Abbe number of the fourth lens element is V4, an Abbe number of the fifth lens element is V5, a central thickness of the fourth lens element along the optical path is CT4, a central thickness of the fifth lens element along the optical path is CT5, an axial distance between the fourth lens element and the fifth lens element is T45, and the following conditions are satisfied:

$$1.5 < Fno < 2.0;$$

$$1.8 < (V2 + V4)/(V3 + V5) < 4.0; \text{ and}$$

$$1.1 < (CT4 + CT5)/T45 < 7.3.$$

According to one aspect of the present disclosure, an optical imaging lens assembly comprises five lens elements. The five lens elements in order from an object side to an image side along an optical path are a first lens element, a second lens element, a third lens element, a fourth lens element, and a fifth lens element. Each of the first through fifth lens elements has an object-side surface facing the object side and an image-side surface facing the image side.

Preferably, the image-side surface of the first lens element is concave in a paraxial region thereof, the second lens element has positive refractive power, the object-side surface of the second lens element is convex in a paraxial region thereof, the third lens element has negative refractive power, the object-side surface of the fourth lens element is convex in a paraxial region thereof, the object-side surface of the fifth lens element is concave in a paraxial region thereof, and at least one of the object-side surface and the image-side surface of at least one of the first through fifth lens elements has at least one inflection point in an off-axis region thereof. Preferably, an f-number of the optical imaging lens assembly is Fno, an Abbe number of the fourth lens element is V4, an Abbe number of the fifth lens element is V5, a central thickness of the fourth lens element along the optical path is CT4, an axial distance between the fourth lens element and the fifth lens element is T45, and the following conditions are satisfied:

$$1.5 < Fno < 2.0;$$

$$1.5 < V4/V5 < 4.0; \text{ and}$$

$$0.65 < CT4/T45 < 4.3.$$

DETAILED DESCRIPTION

Figure 1A:
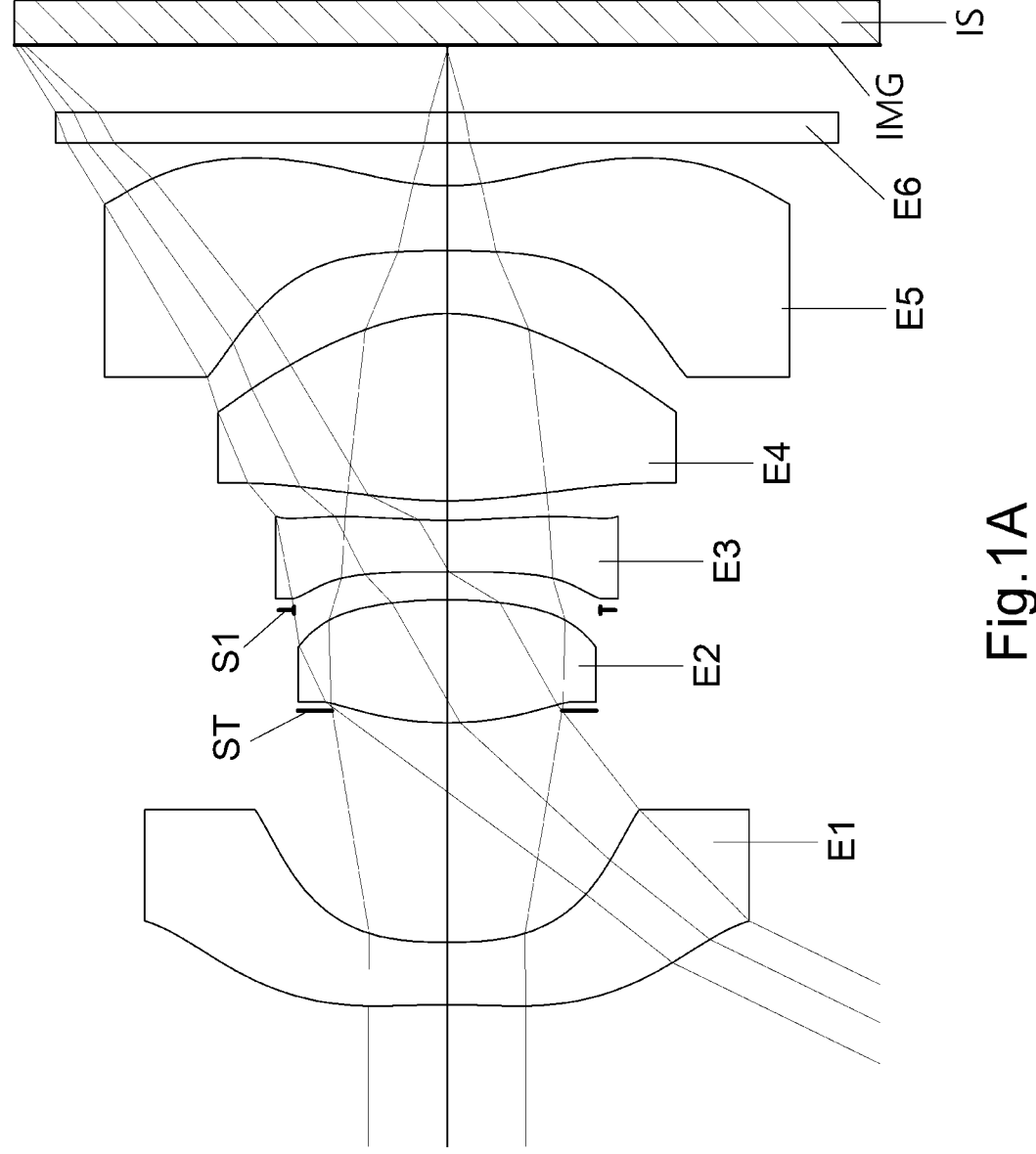
FIG. 1A is a schematic view of an imaging apparatus according to the 1st embodiment of the present disclosure.

The present disclosure provides an optical imaging lens assembly comprising five lens elements. The five lens elements in order from an object side to an image side along an optical path are a first lens element, a second lens element, a third lens element, a fourth lens element, and a fifth lens element. Each of the first through fifth lens elements has an object-side surface facing the object side and an image-side surface facing the image side.

The first lens element has negative refractive power, which is favorable for increasing the field of view.

The image-side surface of the first lens element is concave in a paraxial region thereof so that the surface shapes and refractive power of the first lens element can be adjusted, which is favorable for increasing the field of view.

The second lens element has positive refractive power, which is favorable for reducing the volume of the optical imaging lens assembly on the object side.

The object-side surface of the second lens element is convex in a paraxial region thereof so that the surface shapes and refractive power of the second lens element can be adjusted, which is favorable for reducing the volume of the optical imaging lens assembly on the object side.

The image-side surface of the second lens element is convex in a paraxial region thereof so that the light traveling direction can be adjusted, which is favorable for increasing the field of view.

The third lens element has negative refractive power, which can help balance the refractive power distribution of the optical imaging lens assembly and thereby correct aberrations such as spherical aberrations.

The image-side surface of the third lens element is concave in a paraxial region thereof, so that the third lens element can coordinate with the fourth lens element to correct aberrations favorably.

The fourth lens element has positive refractive power, which is favorable for reducing the volume of the optical imaging lens assembly on the image side.

The object-side surface of the fourth lens element is convex in a paraxial region thereof, which is favorable for improving image quality of wide-field light.

The image-side surface of the fourth lens element is convex in a paraxial region thereof, so that the light traveling direction can be adjusted to favorably increase the image surface.

The fifth lens element has negative refractive power, which is favorable for adjusting a proper back focal length.

The object-side surface of the fifth lens element is concave in a paraxial region thereof so that the incident angle of light on the fifth lens element can be adjusted, which is favorable for reducing surface reflections.

At least one of the object-side surface and the image-side surface of at least one of the first through fifth lens elements has at least one inflection point in an off-axis region thereof, so that the degree of variation in the surfaces of the lens elements can be increased, which can help reduce the size of the optical imaging lens assembly and correct aberrations. Moreover, at least two or three of the first through fifth lens elements may each have at least one inflection point in an off-axis region on at least one of the object-side surface and the image-side surface.

The image-side surface of the third lens element has at least one convex critical point in an off-axis region thereof so that the surface shapes of the third lens element can be adjusted, which is favorable for correcting off-axis aberrations.

An f-number of the optical imaging lens assembly is Fno. When the following condition is satisfied: 1.5<Fno<2.0, a balance between illuminance and depth of field can be achieved. Moreover, the following condition can be satisfied: 1.6<Fno<1.9. Moreover, the following condition can be satisfied: $1.69 \leq Fno \leq 1.88$.

An Abbe number of the second lens element is V2, an Abbe number of the third lens element is V3, an Abbe number of the fourth lens element is V4, and an Abbe number of the fifth lens element is V5. When the following condition is satisfied: 1.8<(V2+V4)/(V3+V5)<4.0, the arrangement of the materials of the lens elements can be adjusted to correct aberrations such as chromatic aberrations. Moreover, the following condition can be satisfied: 2.1<(V2+V4)/(V3+V5)<3.5. Moreover, the following condition can be satisfied: $2.35 \leq (V2+V4)/(V3+V5) \leq 3.05$.

The Abbe number of the fourth lens element is V4, and the Abbe number of the fifth lens element is V5. When the following condition is satisfied: 1.5<V4/V5<4.0, the fourth lens element can coordinate with the fifth lens element to correct aberrations such as chromatic aberrations. Moreover, the following condition can be satisfied: 1.7<V4/V5<3.5. Moreover, the following condition can be satisfied: $1.98 \leq V4/V5 \leq 3.05$.

A central thickness of the fourth lens element along the optical path is CT4, a central thickness of the fifth lens element along the optical path is CT5, and an axial distance between the fourth lens element and the fifth lens element is T45. When the following condition is satisfied: 1.1<(CT4+CT5)/T45<7.3, the fourth lens element can coordinate with the fifth lens element and is favorable for adjusting the volume distribution on the image side of the optical imaging lens assembly. Moreover, the following condition can be satisfied: 1.6<(CT4+CT5)/T45<5.4. Moreover, the following condition can be satisfied: $2.00 \leq (CT4+CT5)/T45 \leq 4.01$.

The central thickness of the fourth lens element along the optical path is CT4, and the axial distance between the fourth lens element and the fifth lens element is T45. When the following condition is satisfied: 0.25<CT4/T45<5.5, the fourth lens element can coordinate with the fifth lens element and is favorable for adjusting the volume distribution on the image side of the optical imaging lens assembly. Moreover, the following condition can be satisfied: 0.65<CT4/T45<4.3. Moreover, the following condition can be satisfied: 1.0<CT4/T45<3.2. Moreover, the following condition can be satisfied: $1.46 \leq CT4/T45 \leq 2.98$.

A central thickness of the first lens element along the optical path is CT1, a central thickness of the second lens element along the optical path is CT2, a central thickness of the third lens element along the optical path is CT3, the central thickness of the fourth lens element along the optical path is CT4, and the central thickness of the fifth lens element along the optical path is CT5. When the following condition is satisfied: 0.80<(CT2+CT4)/(CT1+CT3+CT5)<1.9, distribution of the lens elements can be adjusted, which is favorable for increasing the field of view and reducing the volume of the optical imaging lens assembly.

A curvature radius of the image-side surface of the first lens element is R2, and a curvature radius of the object-side surface of the second lens element is R3. When the following condition is satisfied: 0.75<R2/R3<2.3, the surface shapes of the first lens element and the second lens element can complement each other, which is favorable for correcting aberrations and reducing stray light.

A focal length of the third lens element is f3, a focal length of the fourth lens element is f4, and a focal length of the fifth lens element is f5. When the following condition is satisfied: −11<(f3+f5)/f4<−3.2, distribution of the refractive power of the optical imaging lens assembly can be adjusted, which is favorable for correcting spherical aberrations and distortions.

A maximum distance between the optically effective area of the object-side surface of the first lens element and an optical axis is Y11, and a maximum distance between the optically effective area of the image-side surface of the fifth lens element and the optical axis is Y52. When the following condition is satisfied: 0.95<Y52/Y11<1.5, the light traveling direction can be adjusted, which is favorable for achieving a balance among the field of view, image surface size, and volume distribution.

An axial distance between the first lens element and the second lens element is T12, an axial distance between the second lens element and the third lens element is T23, an axial distance between the third lens element and the fourth lens element is T34, and the axial distance between the fourth lens element and the fifth lens element is T45. When the following condition is satisfied: 4.0<(T12+T45)/(T23+T34)<15, distribution of the lens elements in the optical imaging lens assembly can be adjusted, which is favorable for increasing the field of view. Moreover, the following condition can be satisfied: 4.5<(T12+T45)/(T23+T34)<11.

The central thickness of the fourth lens element along the optical path is CT4, a curvature radius of the object-side surface of the fourth lens element is R7, and a curvature radius of the image-side surface of the fourth lens element is R8. When the following condition is satisfied: |CT4/R7+CT4/R8|<0.80, the surface shapes of the fourth lens element can be adjusted, which is favorable for correcting aberrations such as comatic aberrations.

A curvature radius of the image-side surface of the third lens element is R6, and a focal length of the optical imaging lens assembly is f. When the following condition is satisfied: 1.1<R6/f<7.0, the shapes and refractive power of the third lens element can be adjusted to favorably correct aberrations such as astigmatism. Moreover, the following condition can be satisfied: 1.4<R6/f<5.5.

A composite focal length of the first lens element and the second lens element is f12, and the focal length of the optical imaging lens assembly is f. When the following condition is satisfied: 1.1<f12/f<4.0, the volume of the optical imaging lens assembly on the object side can be reduced favorably. Moreover, the following condition can be satisfied: 1.3<f12/f<3.0.

An axial distance between the object-side surface of the first lens element and an image surface is TL, and a maximum image height of the optical imaging lens assembly is ImgH (which can be half of a diagonal length of the effective photosensitive area of the image sensor). When the following condition is satisfied: 1.6<TL/ImgH<2.6, a balance between reducing the total track length of the optical imaging lens assembly and enlarging the image surface can be achieved.

Half of a maximum field of view of the optical imaging lens assembly is HFOV. When the following condition is satisfied: 49.2 degrees<HFOV<70.3 degrees, the field of view can be favorably increased while aberrations such as distortions caused by an excessive field of view can be avoided.

A maximum central thickness among those of the first through fifth lens elements along the optical path is CTmax, and a minimum central thickness among those of the first through fifth lens elements along the optical path is CTmin. When the following condition is satisfied: 2.8<CTmax/CTmin<4.3, distribution of the lens elements in the optical imaging lens assembly can be adjusted, which is favorable for reducing the volume of the lens assembly.

The axial distance between the object-side surface of the first lens element and an image surface is TL, and the focal length of the optical imaging lens assembly is f. When the following condition is satisfied: 1.5<TL/f<3.9, a balance between reducing the total track length of the optical imaging lens assembly and enlarging the field of view can be achieved.

A maximum distance between the optically effective area of the image-side surface of the fifth lens element and the optical axis is Y52, and a maximum distance between the optically effective area of an aperture stop and the optical axis is YS. When the following condition is satisfied: 2.2<Y52/YS<3.5, the light traveling direction can be adjusted, which is favorable for increasing the field of view and correcting off-axis aberrations.

A curvature radius of the object-side surface of the fifth lens element is R9, and the focal length of the optical imaging lens assembly is f. When the following condition is satisfied: −5.0<R9/f<−0.10, the surface shapes and refractive power of the fifth lens element can be adjusted, which is favorable for improving image quality of wide-field light. Moreover, the following condition can be satisfied: −4.0<R9/f<−0.25.

A focal length of the second lens element is f2, and central thickness of the second lens element along the optical path is CT2. When the following condition is satisfied: 2.4<f2/CT2<5.0, the surface shapes and refractive power of the second lens element can be adjusted, which is favorable for reducing the volume of the optical imaging lens assembly. Moreover, the following condition can be satisfied: 2.6<f2/CT2<4.5.

A curvature radius of the image-side surface of the second lens element is R4, and the central thickness of the second lens element along the optical path is CT2. When the following condition is satisfied: −5.0<R4/CT2<−2.0, the surface shapes of the second lens element can be adjusted, which is favorable for providing wide-angle configurations.

The present disclosure provides an imaging apparatus comprising the aforementioned optical imaging lens assembly and an image sensor disposed on an image surface of the optical imaging lens assembly.

The present disclosure further provides an electronic device comprising the aforementioned imaging apparatus.

Figure 8:
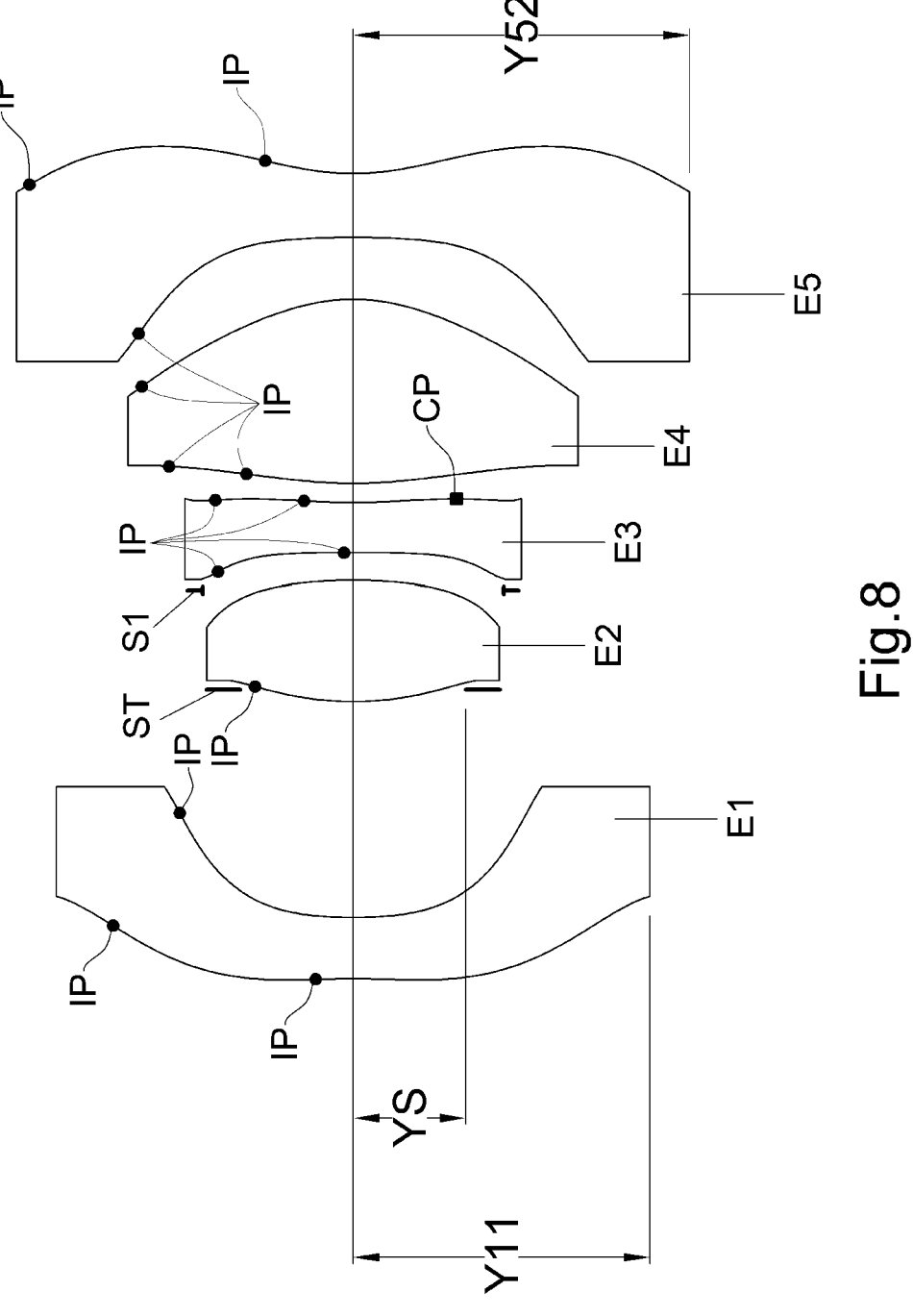
FIG. 8 is a schematic view illustrating certain parameters, inflection points on the surfaces of the lens elements, and a convex critical point on the image-side surface of the third lens element of the optical imaging lens assembly, with the 1st embodiment of the present disclosure as an example.

Please refer to FIG. 8, which is a schematic view illustrating the parameters Y11, Y52, YS, inflection points on the surfaces of the lens elements, and a convex critical point on the image-side surface of the third lens element of the optical imaging lens assembly, with the 1st embodiment of the present disclosure as an example. Y11 is a maximum distance between the optically effective area of the object-side surface of the first lens element and an optical axis, Y52 is a maximum distance between the optically effective area of the image-side surface of the fifth lens element and the optical axis, YS is a maximum distance between the optically effective area of a stop and the optical axis, IP is an inflection point on a surface of a lens element, and CP is a convex critical point on the image-side surface of the third lens element. FIG. 8 illustrates, by way of example, inflection points on the surfaces of certain lens elements and a convex critical point on the image-side surface of the third lens element in accordance with the 1st embodiment of the present disclosure. However, in either the 1st embodiment or other embodiments of the present disclosure, each of the lens elements may have one or more inflection points or one or more critical points on a surface thereof. According to the optical imaging lens assembly of the present disclosure, an inflection point is a point on a surface of a lens element where the surface curvature changes from being positive to being negative, or vice versa; and a critical point is a point on a surface of a lens element that is tangent to a tangent plane perpendicular to the optical axis, exclusive of the intersection of the aforementioned surface and the optical axis.

The aforementioned features of the optical imaging lens assembly can be utilized in numerous combinations so as to achieve corresponding effects.

According to the optical imaging lens assembly of the present disclosure, the optical elements thereof can be made of glass or plastic material. When the optical elements are made of glass material, the distribution of the refractive power of the optical imaging lens assembly may be more flexible to design and the effect of external environmental temperature on imaging can be reduced. Technologies such as grinding or molding can be used for producing glass optical elements. When the optical elements are made of plastic material, manufacturing costs can be effectively reduced. Furthermore, surfaces of each optical element can be arranged to be spherical or aspheric (ASP). Arranging the spherical surfaces can reduce difficulties in manufacturing while arranging the aspheric surfaces can result in more control variables for eliminating aberrations and to further decrease the required quantity of optical elements; also, the total track length of the optical imaging lens assembly can be effectively reduced. Processes such as plastic injection molding or molded glass lens can be used for making the aspheric surfaces.

According to the optical imaging lens assembly of the present disclosure, if a surface of an optical element is aspheric, it means that the surface has an aspheric shape throughout its optically effective area, or a portion(s) thereof.

According to the optical imaging lens assembly of the present disclosure, additives may be selectively added to the material of any one (or more) optical element to produce light absorption or light interference effects, so as to change the transmittance of said optical element in a particular wavelength range of light, and to further reduce stray light and chromatic aberrations. For example, an additive that can filter off light in the wavelength range of 600-800 nm may be added to reduce extra red or infrared light, or an additive that can filter off light in the wavelength range of 350-450 nm may be added to reduce blue or ultraviolet light in the optical elements. Thus, additives can prevent unwanted disrupting light in particular wavelength ranges affecting the final image. In addition, additives may be evenly mixed in the plastic material for manufacturing optical elements with an injection molding process. In addition, additives may also be added to a coating on the surface of a lens element to provide the aforementioned effects.

According to the optical imaging lens assembly of the present disclosure, the optical imaging lens assembly can include at least one stop, such as an aperture stop, a glare stop or a field stop, so as to favorably reduce the amount of stray light and thereby improve the image quality.

According to the optical imaging lens assembly of the present disclosure, an aperture stop can be configured as a front stop or a middle stop. The front stop disposed between an imaged object and the first optical element can provide a longer distance between an exit pupil of the optical imaging lens assembly and the image surface, so that the generated telecentric effect can improve the image-sensing efficiency of an image sensor, such as a CCD or CMOS sensor. The middle stop disposed between the first optical element and the image surface is favorable for enlarging the field of view of the optical imaging lens assembly, thereby providing the optical imaging lens assembly with the advantage of a wide-angle lens.

An aperture control unit may be disposed in the optical imaging lens assembly of the present disclosure. The aperture control unit may be a mechanical part or optical moderation part, in which the size and shape of the aperture may be controlled by electricity or electronic signals. The mechanical part may include moving parts such as blades, shielding sheets, etc. The optical moderation part may include shielding materials such as filters, electrochromic materials, liquid crystal layers, etc. The aperture control unit can control the amount of incoming light and exposure time so as to further improve the image quality. Meanwhile, the aperture control unit may represent the aperture in the present disclosure that can adjust the image properties such as depth of field or exposure speed by changing the f-number of the optical imaging lens assembly.

According to the optical imaging lens assembly of the present disclosure, when the optical element has a convex surface and the region of convex shape is not specified, it indicates that the surface can be convex in the paraxial region thereof. When the optical element has a concave surface and the region of concave shape is not specified, it indicates that the surface can be concave in the paraxial region thereof. Likewise, when the region of refractive power or focal length of an optical element is not specified, it indicates that the region of refractive power or focal length of the optical element can be in the paraxial region thereof.

According to the optical imaging lens assembly of the present disclosure, at least one optical element capable of folding the optical path, such as a prism or a reflective mirror, can be optionally provided on the optical path between the imaged object and the image surface, wherein the surface shape of the prism or reflective mirror can be flat, spherical, aspheric or freeform. Then, the optical imaging lens assembly can be provided with more flexibility for its space arrangement, so that minimization of electronic devices is not limited by the total track length of the optical imaging lens assembly.

According to the optical imaging lens assembly of the present disclosure, the image surface of the optical imaging lens assembly, based on the corresponding image sensor, can be a plane or a curved surface with an arbitrary curvature, especially a curved surface being concave facing the object side. Meanwhile, the optical imaging lens assembly of the present disclosure may optionally include one or more image correction components (such as a field flattener) between the image surface and the optical element closest to the image surface for the purpose of image corrections (such as field curvature correction). The optical properties of the image correction components such as curvatures, thicknesses, indices, positions and shapes (convex or concave, spherical or aspheric, diffractive surface and Fresnel surface, etc.) can be adjusted according to the requirement of the imaging apparatus. Preferably, an image correction component may be a thin plano-concave component having a surface being concave toward the object side and arranged near the image surface.

One or more optical elements can be provided in the optical imaging lens assembly of the present disclosure to limit the forms of light passing through the system. The aforementioned optical element may be (but is not limited to) a filter or a polarizer, and may be provided in the form of a single piece, a composite component or a thin film, but is not limited thereto. The aforementioned optical element can be disposed on the object side or image side of the optical imaging lens assembly or alternatively between the lens elements of the assembly to control specific forms of light to pass through, so as to meet different application needs.

The optical imaging lens assembly of the present disclosure can comprise at least one of an optical lens element, an optical element or a carrier, which includes a low reflection layer disposed on at least one surface thereof. The low reflection layer can effectively reduce the stray light generated by light reflection at the interface. The low reflection layer can be disposed on the non-effective area of the object-side surface or the image-side surface of the aforementioned optical lens element, or on a connecting surface between the object-side surface and the image-side surface. The aforementioned optical element can be a light blocking element, an annular spacer element, a barrel element, a cover glass, a blue glass, a filter/color filter, an optical path folding element, a prism, or a mirror. The aforementioned carrier can be a lens assembly carrier, a micro lens disposed on the image sensor, or a glass sheet surrounding the substrate of the image sensor or used for protecting the image sensor.

According to the above description of the present disclosure, the following specific embodiments are provided for further explanation.

1st Embodiment

Figure 1B:
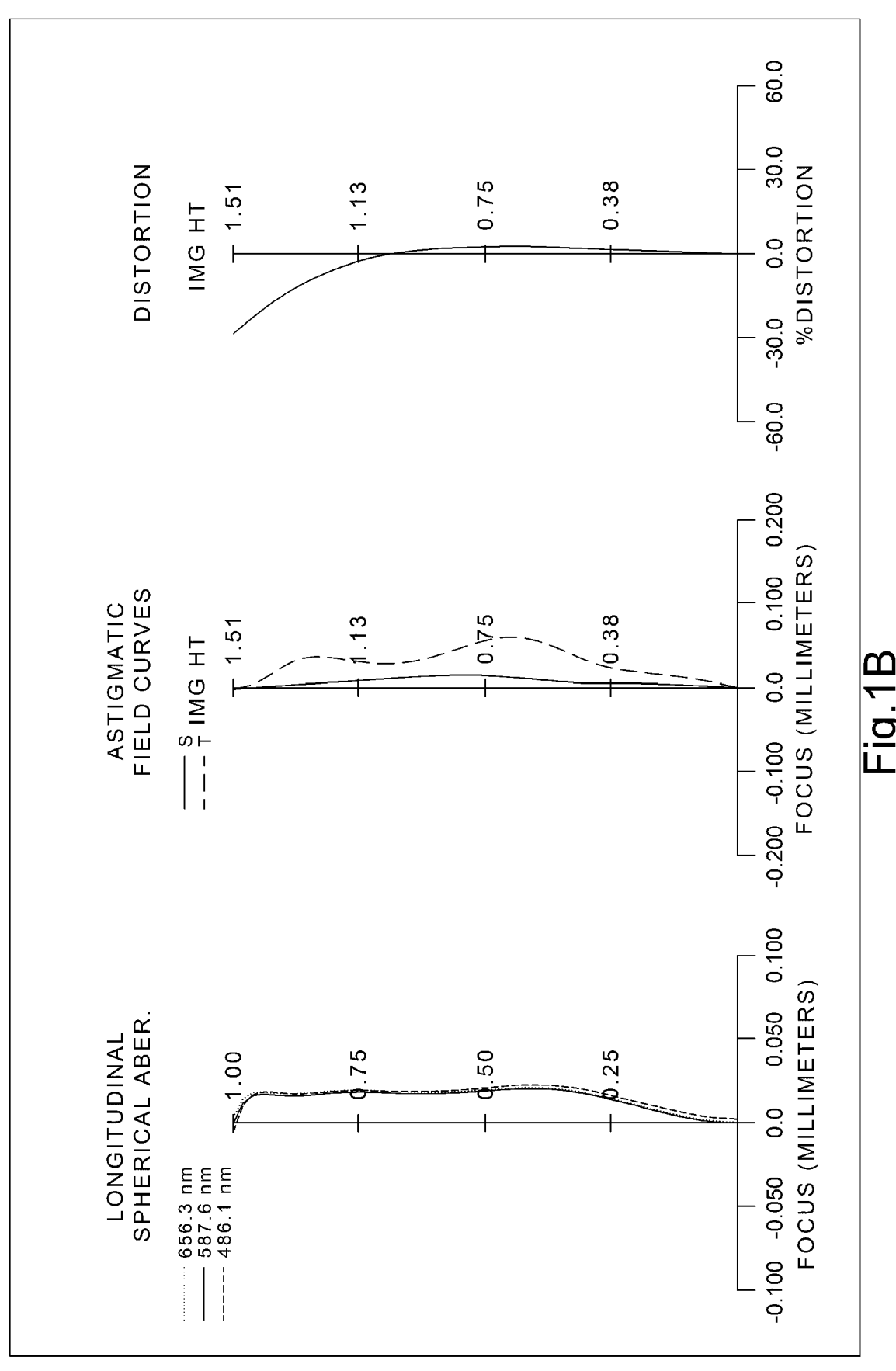
FIG. 1B shows longitudinal spherical aberration curves, astigmatic field curves and a distortion curve of the imaging apparatus according to the 1st embodiment.

FIG. 1A is a schematic view of an imaging apparatus 1 according to the 1st embodiment of the present disclosure. FIG. 1B shows, in order from left to right, longitudinal spherical aberration curves, astigmatic field curves and a distortion curve of the imaging apparatus 1 according to the 1st embodiment.

In FIG. 1A, the imaging apparatus 1 includes an optical imaging lens assembly of the present disclosure and an image sensor IS. The optical imaging lens assembly includes, in order from an object side to an image side along an optical path, a first lens element E1, an aperture stop ST, a second lens element E2, a stop S1, a third lens element E3, a fourth lens element E4, a fifth lens element E5, a filter E6, and an image surface IMG. The image sensor IS is disposed on or near the image surface IMG. The optical imaging lens assembly includes five lens elements (E1, E2, E3, E4 and E5), with no additional lens element disposed between the adjacent lens elements.

The first lens element E1 has negative refractive power and is made of plastic material. The first lens element E1 has an object-side surface being concave in a paraxial region thereof and having two inflection points in an off-axis region thereof, and an image-side surface being concave in a paraxial region thereof and having one inflection point in an off-axis region thereof. Both the object-side surface and the image-side surface are aspheric.

The second lens element E2 has positive refractive power and is made of plastic material. The second lens element E2 has an object-side surface being convex in a paraxial region thereof and having one inflection point in an off-axis region thereof, and an image-side surface being convex in a paraxial region thereof. Both the object-side surface and the image-side surface are aspheric.

The third lens element E3 has negative refractive power and is made of plastic material. The third lens element E3 has an object-side surface being convex in a paraxial region thereof and having two inflection points in an off-axis region thereof, and an image-side surface being concave in a paraxial region thereof and having two inflection points and one convex critical point in an off-axis region thereof. Both the object-side surface and the image-side surface are aspheric.

The fourth lens element E4 has positive refractive power and is made of plastic material. The fourth lens element E4 has an object-side surface being convex in a paraxial region thereof and having two inflection points in an off-axis region thereof, and an image-side surface being convex in a paraxial region thereof and having one inflection point in an off-axis region thereof. Both the object-side surface and the image-side surface are aspheric.

The fifth lens element E5 has negative refractive power and is made of plastic material. The fifth lens element E5 has an object-side surface being concave in a paraxial region thereof and having one inflection point in an off-axis region thereof, and an image-side surface being concave in a paraxial region thereof and having two inflection points in an off-axis region thereof. Both the object-side surface and the image-side surface are aspheric.

The filter E6 is disposed between the fifth lens element E5 and the image surface IMG. The filter E6 is made of glass material and does not affect the focal length of the optical imaging lens assembly.

The detailed optical data of the 1st embodiment are shown in TABLE 1A, wherein the units of the curvature radius, the thickness and the focal length are expressed in mm, f is a focal length of the optical imaging lens assembly, Fno is an f-number of the optical imaging lens assembly, HFOV is half of the maximum field of view, and surfaces #0 to #15 refer to the surfaces in order from the object side to the image side. The aspheric surface data are shown in TABLE 1B, wherein k is the conic coefficient in the equation of the aspheric surface profiles, and A4-A26 refer to the 4th to 26th order aspheric coefficients.

Further, it should be noted that the tables shown in each of the following embodiments are associated with the schematic view and diagrams of longitudinal spherical aberration curves, astigmatic field curves and a distortion curve for the respective embodiment. Also, the definitions of the parameters presented in later tables are the same as those of the parameters presented in TABLE 1A and TABLE 1B for the 1 st embodiment. Explanations in this regard will not be provided again.

TABLE 1A

|  | | (1st Embodiment) f = 1.02 mm, Fno = 1.85, HFOV = 64.0 deg. | | | | | | |
|---|---|---|---|---|---|---|---|---|
| Surface # | | Curvature Radius | | Thickness | Material | Index | Abbe # | Focal Length |
| 0 | Object | Plano | | Infinity | | | | |
| 1 | Lens 1 | −3.46800 | (ASP) | 0.220 | Plastic | 1.545 | 56.1 | −2.10 |
| 2 | | 1.74345 | (ASP) | 0.818 | | | | |
| 3 | Ape. Stop | Plano | | −0.043 | | | | |
| 4 | Lens 2 | 1.11461 | (ASP) | 0.434 | Plastic | 1.544 | 56.0 | 1.34 |
| 5 | | −1.80957 | (ASP) | −0.036 | | | | |
| 6 | Stop | Plano | | 0.134 | | | | |
| 7 | Lens 3 | 68.41020 | (ASP) | 0.180 | Plastic | 1.680 | 18.2 | −2.99 |
| 8 | | 1.96951 | (ASP) | 0.069 | | | | |
| 9 | Lens 4 | 1.47911 | (ASP) | 0.661 | Plastic | 1.544 | 56.0 | 0.94 |
| 10 | | −0.65994 | (ASP) | 0.222 | | | | |
| 11 | Lens 5 | −3.62830 | (ASP) | 0.229 | Plastic | 1.639 | 23.5 | −1.08 |
| 12 | | 0.87496 | (ASP) | 0.150 | | | | |
| 13 | Filter | Plano | | 0.110 | Glass | 1.517 | 64.2 | — |
| 14 | | Plano | | 0.237 | | | | |
| 15 | Image Surface | Plano | | — | | | | |

Reference wavelength is d-line 587.6 nm.
The effective radius of the stop (S1) on Surface #6 is 0.540 mm.

50

TABLE 1B

| | Aspheric Coefficient | | | | |
|---|---|---|---|---|---|
| Surface # | 1 | 2 | 4 | 5 | 7 |
| k = | −9.00000E+01 | −2.20968E+01 | −6.12724E+00 | 3.78663E+00 | 0.00000E+00 |
| A4 = | 1.2043675E+00 | 2.3241921E+00 | 4.3627548E−01 | −8.1331933E−02 | −1.4827902E+00 |
| A6 = | −2.0824217E+00 | −2.0809269E−01 | 1.0192937E+00 | −1.1245784E+01 | 4.5621972E+00 |
| A8 = | 1.5514954E+00 | −9.0779400E+00 | −3.7486564E+01 | 1.8681007E+02 | 4.0424926E+01 |
| A10 = | 2.6506628E+00 | −1.9359704E+00 | 1.6189673E+02 | −2.0435151E+03 | −1.5678698E+03 |
| A12 = | −7.9678700E+00 | 2.5158875E+02 | 8.1563383E+02 | 1.2861263E+04 | 1.7555646E+04 |
| A14 = | 8.1756019E+00 | −7.7759988E+02 | −1.0308352E+04 | −4.8244009E+04 | −1.0460493E+05 |
| A16 = | −3.9287584E+00 | 7.5677968E+02 | 2.4243889E+04 | 1.0322668E+05 | 3.4551782E+05 |
| A18 = | 7.4186802E−01 | −1.6544536E+02 | | −1.1253310E+05 | −5.8492119E+05 |
| A20 = | | | | 4.7125113E+04 | 3.9249947E+05 |

TABLE 1B-continued

| Surface # | 8 | 9 | 10 | 11 | 12 |
|---|---|---|---|---|---|
| | | | Aspheric Coefficient | | |
| k = | −9.22808E+00 | −3.04932E+01 | −2.80191E+00 | 5.77708E+00 | −1.11974E+01 |
| A4 = | −1.8387380E+00 | −1.9390992E−01 | 5.1235578E−01 | −3.7504767E−01 | 5.9543147E−01 |
| A6 = | 8.9954538E+00 | −1.0153703E−02 | −5.0749931E+00 | 3.3912717E+00 | −7.5875541E+00 |
| A8 = | −1.3482226E+01 | 8.0710510E+00 | 3.0054177E+01 | −8.8042421E+01 | 3.3568855E+01 |
| A10 = | −2.3879560E+02 | −6.1514275E+01 | −1.2487754E+02 | 6.5858520E+02 | −9.3781331E+01 |
| A12 = | 2.0785811E+03 | 2.2408812E+02 | 3.4743730E+02 | −2.6798449E+03 | 1.8180108E+02 |
| A14 = | −7.9216161E+03 | −4.3208709E+02 | −6.1349974E+02 | 6.7193072E+03 | −2.5145743E+02 |
| A16 = | 1.5877239E+04 | 3.5912557E+02 | 6.4394304E+02 | −1.0675071E+04 | 2.4881072E+02 |
| A18 = | −1.5431125E+04 | 3.6714445E+01 | −3.5920219E+02 | 1.0476366E+04 | −1.7397625E+02 |
| A20 = | 5.3332384E+03 | −1.6214935E+02 | 8.0578150E+01 | −5.7851383E+03 | 8.3580200E+01 |
| A22 = | | | | 1.3711874E+03 | −2.6140263E+01 |
| A24 = | | | | | 4.7748361E+00 |
| A26 = | | | | | −3.8519341E−01 |

The equation of the aspheric surface profiles is expressed as follows:

$$X(Y) = (Y^2/R)/(1 + sqrt(1 - (1 + k) * (Y/R)^2)) + \sum_i (Ai) * (Y^i)$$

where:

X is the relative distance between a point on the aspheric surface spaced at a distance Y from the optical axis and the tangential plane at the aspheric surface vertex on the optical axis;

Y is the vertical distance from the point on the aspheric surface profile to the optical axis;

R is the curvature radius;

k is the conic coefficient; and

Ai is the i-th aspheric coefficient.

In the 1st embodiment, the focal length of the optical imaging lens assembly is f, and the following condition is satisfied: f=1.02 mm.

In the 1st embodiment, the f-number of the optical imaging lens assembly is Fno, and the following condition is satisfied: Fno=1.85.

In the 1st embodiment, half of a maximum field of view of the optical imaging lens assembly is HFOV, and the following condition is satisfied: HFOV=64.0 degrees.

In the 1st embodiment, the Abbe number of the second lens element E2 is V2, the Abbe number of the third lens element E3 is V3, the Abbe number of the fourth lens element E4 is V4, the Abbe number of the fifth lens element E5 is V5, and the following condition is satisfied: (V2+V4)/(V3+V5)=2.69.

In the 1st embodiment, the Abbe number of the fourth lens element E4 is V4, the Abbe number of the fifth lens element E5 is V5, and the following condition is satisfied: V4/V5=2.38.

In the 1st embodiment, the central thickness of the first lens element E1 along the optical path is CT1, the central thickness of the second lens element E2 along the optical path is CT2, the central thickness of the third lens element E3 along the optical path is CT3, the central thickness of the fourth lens element E4 along the optical path is CT4, the central thickness of the fifth lens element E5 along the optical path is CT5, and the following condition is satisfied: (CT2+CT4)/(CT1+CT3+CT5)=1.74.

In the 1st embodiment, the central thickness of the fourth lens element E4 along the optical path is CT4, the central thickness of the fifth lens element E5 along the optical path is CT5, the axial distance between the fourth lens element E4 and the fifth lens element E5 is T45, and the following condition is satisfied: (CT4+CT5)/T45=4.01. In this embodiment, the axial distance between two adjacent lens elements means the axial distance between two adjacent surfaces of the two adjacent lens elements.

In the 1st embodiment, the axial distance between the first lens element E1 and the second lens element E2 is T12, the axial distance between the second lens element E2 and the third lens element E3 is T23, the axial distance between the third lens element E3 and the fourth lens element E4 is T34, the axial distance between the fourth lens element E4 and the fifth lens element E5 is T45, and the following condition is satisfied: (T12+T45)/(T23+T34)=5.97.

In the 1st embodiment, the central thickness of the fourth lens element E4 along the optical path is CT4, the curvature radius of the object-side surface of the fourth lens element E4 is R7, the curvature radius of the image-side surface of the fourth lens element E4 is R8, and the following condition is satisfied: |CT4/R7+CT4/R8|=0.55.

In the 1st embodiment, the central thickness of the fourth lens element E4 along the optical path is CT4, the axial distance between the fourth lens element E4 and the fifth lens element E5 is T45, and the following condition is satisfied: CT4/T45=2.98.

In the 1st embodiment, the maximum central thickness among those of the first through fifth lens elements along the optical path is CTmax, the minimum central thickness among those of the first through fifth lens elements along the optical path is CTmin, and the following condition is satisfied: CTmax/CTmin=3.67. In this embodiment, the central thickness of the fourth lens element E4 along the optical path is greater than that of the other lens elements (E1, E2, E3 and E5) along the optical path, and thus CTmax is the central thickness of the fourth lens E4 along the optical path. The central thickness of the third lens element E3 along the optical path is smaller than that of the other lens elements (E1, E2, E4 and E5) along the optical path, and thus CTmin is the central thickness of the third lens E3 along the optical path.

In the 1st embodiment, the axial distance between the object-side surface of the first lens element E1 and the image surface IMG is TL, the focal length of the optical imaging lens assembly is f, and the following condition is satisfied: TL/f=3.31.

In the 1st embodiment, the axial distance between the object-side surface of the first lens element E1 and the image surface IMG is TL, the maximum image height of the optical imaging lens assembly is ImgH, and the following condition is satisfied: TL/ImgH=2.25.

In the 1st embodiment, the curvature radius of the image-side surface of the first lens element E1 is R2, the curvature radius of the object-side surface of the second lens element E2 is R3, and the following condition is satisfied: R2/R3=1.56.

In the 1st embodiment, the curvature radius of the image-side surface of the second lens element E2 is R4, the central thickness of the second lens element E2 along the optical path is CT2, and the following condition is satisfied: R4/CT2=−4.17.

In the 1st embodiment, the curvature radius of the image-side surface of the third lens element E3 is R6, the focal length of the optical imaging lens assembly is f, and the following condition is satisfied: R6/f=1.92.

In the 1st embodiment, the curvature radius of the object-side surface of the fifth lens element E5 is R9, the focal length of the optical imaging lens assembly is f, and the following condition is satisfied: R9/f=−3.54.

In the 1st embodiment, the focal length of the third lens element E3 is f3, the focal length of the fourth lens element E4 is f4, the focal length of the fifth lens element E5 is f5, and the following condition is satisfied: (f3+f5)/f4=−4.32.

In the 1st embodiment, the composite focal length of the first lens element E1 and the second lens element E2 is f12, the focal length of the optical imaging lens assembly is f, and the following condition is satisfied: f12/f=1.62.

In the 1st embodiment, the focal length of the second lens element E2 is f2, the central thickness of the second lens element E2 along the optical path is CT2, and the following condition is satisfied: f2/CT2=3.08.

In the 1st embodiment, the maximum distance between the optically effective area of the image-side surface of the fifth lens element E5 and the optical axis is Y52, the maximum distance between the optically effective area of the object-side surface of the first lens element E1 and an optical axis is Y11, and the following condition is satisfied: Y52/Y11=1.13.

In the 1st embodiment, the maximum distance between the optically effective area of the image-side surface of the fifth lens element E5 and the optical axis is Y52, the maximum distance between the optically effective area of the aperture stop and the optical axis is YS, and the following condition is satisfied: Y52/YS=2.98.

2nd Embodiment

Figure 2A:
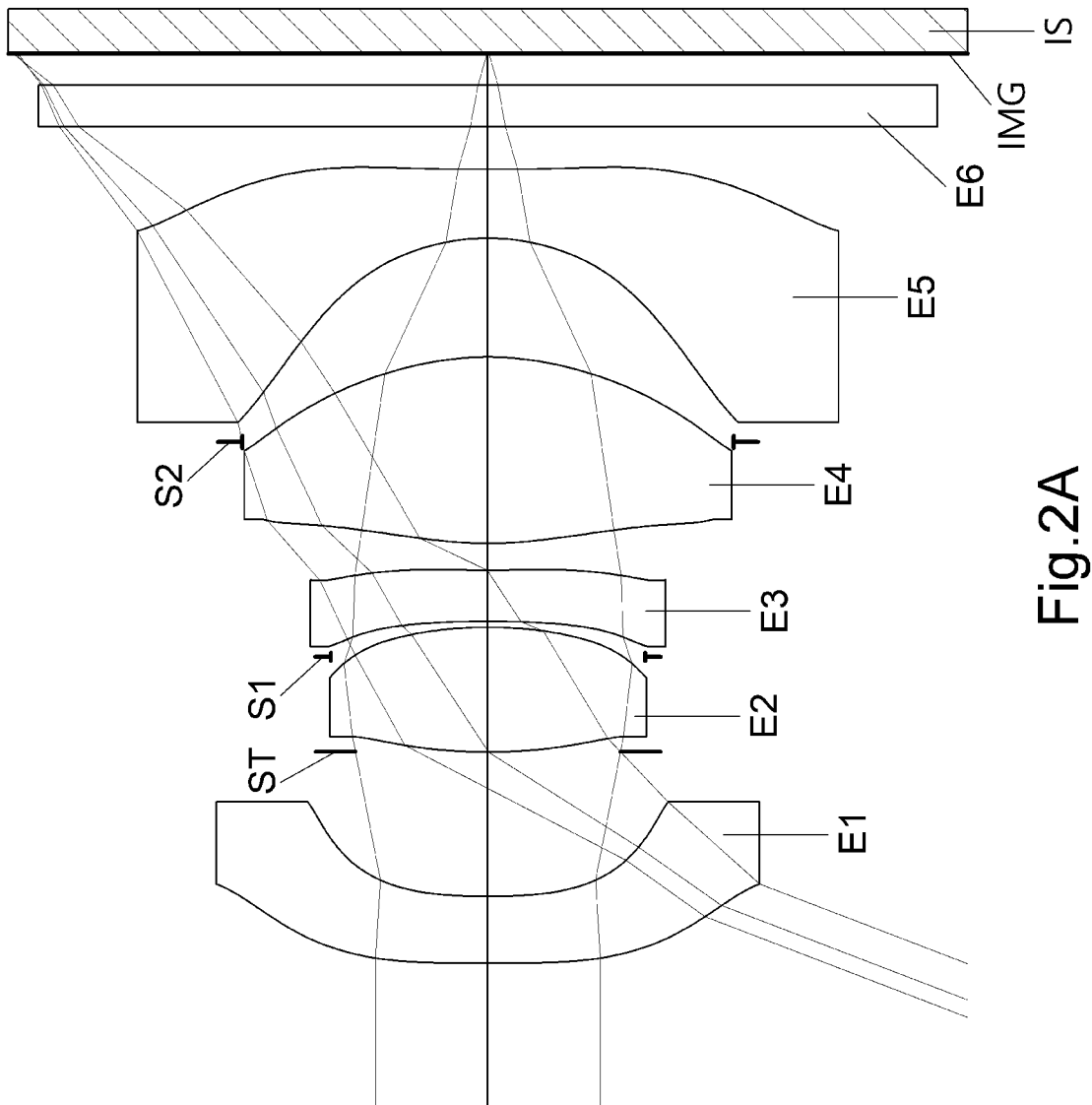
FIG. 2A is a schematic view of an imaging apparatus according to the 2nd embodiment of the present disclosure.
Figure 2B:
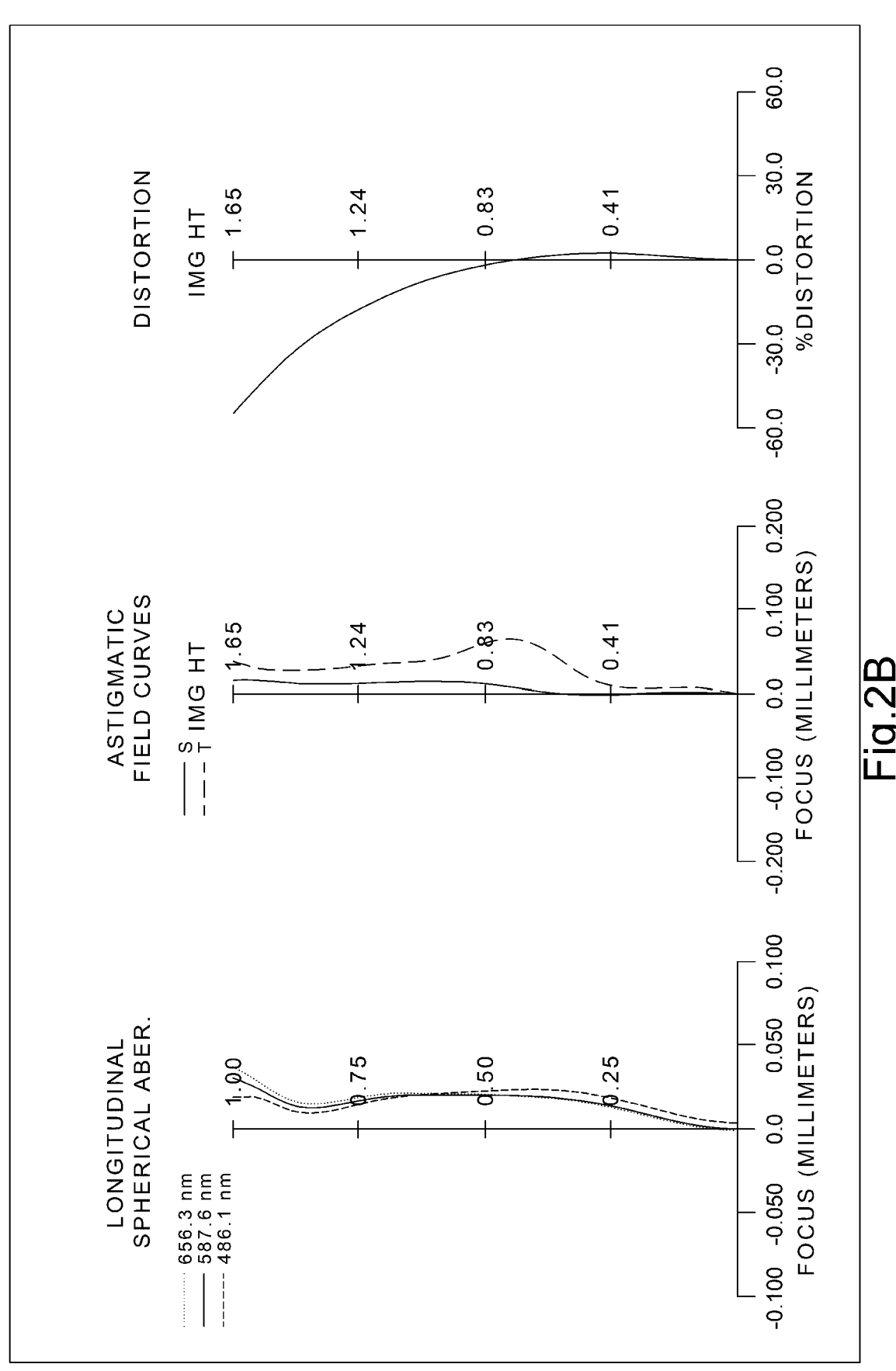
FIG. 2B shows longitudinal spherical aberration curves, astigmatic field curves and a distortion curve of the imaging apparatus according to the 2nd embodiment.

FIG. 2A is a schematic view of an imaging apparatus 2 according to the 2nd embodiment of the present disclosure. FIG. 2B shows, in order from left to right, longitudinal spherical aberration curves, astigmatic field curves and a distortion curve of the imaging apparatus 2 according to the 2nd embodiment.

In FIG. 2A, the imaging apparatus 2 includes an optical imaging lens assembly of the present disclosure and an image sensor IS. The optical imaging lens assembly includes, in order from an object side to an image side along an optical path, a first lens element E1, an aperture stop ST, a second lens element E2, a stop S1, a third lens element E3, a fourth lens element E4, a stop S2, a fifth lens element E5, a filter E6, and an image surface IMG. The image sensor IS is disposed on or near the image surface IMG. The optical imaging lens assembly includes five lens elements (E1, E2, E3, E4 and E5), with no additional lens element disposed between the adjacent lens elements.

The first lens element E1 has negative refractive power and is made of plastic material. The first lens element E1 has an object-side surface being flat in a paraxial region thereof and having one inflection point in an off-axis region thereof, and an image-side surface being concave in a paraxial region thereof and having one inflection point in an off-axis region thereof. Both the object-side surface and the image-side surface are aspheric.

The second lens element E2 has positive refractive power and is made of plastic material. The second lens element E2 has an object-side surface being convex in a paraxial region thereof and having one inflection point in an off-axis region thereof, and an image-side surface being convex in a paraxial region thereof. Both the object-side surface and the image-side surface are aspheric.

The third lens element E3 has negative refractive power and is made of plastic material. The third lens element E3 has an object-side surface being concave in a paraxial region thereof and having one inflection point in an off-axis region thereof, and an image-side surface being concave in a paraxial region thereof and having two inflection points and one convex critical point in an off-axis region thereof. Both the object-side surface and the image-side surface are aspheric.

The fourth lens element E4 has positive refractive power and is made of plastic material. The fourth lens element E4 has an object-side surface being convex in a paraxial region thereof and having two inflection points in an off-axis region thereof, and an image-side surface being convex in a paraxial region thereof and having one inflection point in an off-axis region thereof. Both the object-side surface and the image-side surface are aspheric.

The fifth lens element E5 has negative refractive power and is made of plastic material. The fifth lens element E5 has an object-side surface being concave in a paraxial region thereof and having two inflection points in an off-axis region thereof, and an image-side surface being convex in a paraxial region thereof and having three inflection points in an off-axis region thereof. Both the object-side surface and the image-side surface are aspheric.

The filter E6 is disposed between the fifth lens element E5 and the image surface IMG. The filter E6 is made of glass material and does not affect the focal length of the optical imaging lens assembly.

The detailed optical data of the 2nd embodiment are shown in TABLE 2A, and the aspheric surface data are shown in TABLE 2B.

TABLE 2A

|  |  | (2nd Embodiment) f = 1.37 mm, Fno = 1.75, HFOV = 69.0 deg. |  |  |  |  |  |
| --- | --- | --- | --- | --- | --- | --- | --- |
| Surface # |  | Curvature Radius | Thickness | Material | Index | Abbe # | Focal Length |
| 0 | Object | Plano | 380.000 |  |  |  |  |
| 1 | Lens 1 | Infinity (ASP) | 0.233 | Plastic | 1.614 | 25.6 | −3.66 |

TABLE 2A-continued

| | | (2nd Embodiment) f = 1.37 mm, Fno = 1.75, HFOV = 69.0 deg. | | | | | |
|---|---|---|---|---|---|---|---|
| Surface # | | Curvature Radius | Thickness | Material | Index | Abbe # | Focal Length |
| 2 | | 2.24501 (ASP) | 0.507 | | | | |
| 3 | Ape. Stop | Plano | −0.001 | | | | |
| 4 | Lens 2 | 1.82670 (ASP) | 0.437 | Plastic | 1.544 | 56.0 | 1.69 |
| 5 | | −1.69104 (ASP) | −0.103 | | | | |
| 6 | Stop | Plano | 0.123 | | | | |
| 7 | Lens 3 | −13.03640 (ASP) | 0.180 | Plastic | 1.639 | 23.5 | −4.40 |
| 8 | | 3.59840 (ASP) | 0.094 | | | | |
| 9 | Lens 4 | 1.25955 (ASP) | 0.651 | Plastic | 1.544 | 56.0 | 1.16 |
| 10 | | −1.03401 (ASP) | −0.297 | | | | |
| 11 | Stop | Plano | 0.714 | | | | |
| 12 | Lens 5 | −0.71977 (ASP) | 0.241 | Plastic | 1.669 | 19.5 | −1.09 |
| 13 | | −78.09640 (ASP) | 0.150 | | | | |
| 14 | Filter | Plano | 0.145 | Glass | 1.517 | 64.2 | — |
| 15 | | Plano | 0.110 | | | | |
| 16 | Image Surface | Plano | — | | | | |

Reference wavelength is d-line 587.6 nm.
The effective radius of the stop (S1) on Surface #6 is 0.550 mm.
The effective radius of the stop (S2) on Surface #11 is 0.860 mm.

TABLE 2B

| | | | Aspheric Coefficient | | |
|---|---|---|---|---|---|
| Surface # | 1 | 2 | 4 | 5 | 7 |
| k = | 0.00000E+00 | −5.47243E+01 | −6.72320E+00 | 3.46616E+00 | 8.53649E+01 |
| A4 = | 9.3029726E−01 | 1.3959894E+00 | 2.5039549E−01 | −1.8046855E+00 | −3.3509659E+00 |
| A6 = | −2.0053532E+00 | 1.2115777E+01 | −1.0014358E+00 | 3.3096212E+01 | 5.0647899E+01 |
| A8 = | 5.5107275E+00 | −1.9492406E+02 | 9.7311123E+00 | −3.8545113E+02 | −5.3697976E+02 |
| A10 = | −1.2818300E+01 | 1.5670148E+03 | −1.1480756E+02 | 2.8494932E+03 | 3.7148118E+03 |
| A12 = | 2.2100263E+01 | −7.2420334E+03 | 6.2505307E+02 | −1.4290301E+04 | −1.6819823E+04 |
| A14 = | −2.4754457E+01 | 1.9573253E+04 | −1.9335721E+03 | 4.6373745E+04 | 4.6922190E+04 |
| A16 = | 1.4970603E+01 | −2.8205317E+04 | 1.9324116E+03 | −9.1675172E+04 | −7.3904969E+04 |
| A18 = | −3.6431825E+00 | 1.6419936E+04 | | 9.9327408E+04 | 5.6901236E+04 |
| A20 = | | | | −4.4810849E+04 | −1.4664701E+04 |

| Surface # | 8 | 9 | 10 | 12 | 13 |
|---|---|---|---|---|---|
| k = | −3.94422E+01 | −2.80024E+01 | −1.96856E+00 | −2.47972E+00 | 9.00000E+01 |
| A4 = | −2.5474131E+00 | 2.0295683E−02 | 5.4399149E−01 | 1.7305272E−01 | 1.1730192E+00 |
| A6 = | 1.7457960E+01 | −2.0971101E+00 | −6.0581295E+00 | −4.3842946E+00 | −9.5455083E+00 |
| A8 = | −8.6219739E+01 | 1.7659470E+01 | 3.9973663E+01 | −2.3516638E+01 | 3.7541743E+01 |
| A10 = | 2.4879845E+02 | −9.1435113E+01 | −1.7159878E+02 | 3.0893814E+02 | −9.7905549E+01 |
| A12 = | −1.7780983E+02 | 3.0470668E+02 | 4.6062798E+02 | −1.4324758E+03 | 1.7930555E+02 |
| A14 = | −1.3172972E+03 | −6.4484389E+02 | −7.6008131E+02 | 3.7924897E+03 | −2.3514899E+02 |
| A16 = | 4.5620677E+03 | 8.1415334E+02 | 7.4125118E+02 | −6.1636354E+03 | 2.2162180E+02 |
| A18 = | −5.6476782E+03 | −5.3992966E+02 | −3.8733487E+02 | 6.0689709E+03 | −1.4857728E+02 |
| A20 = | 2.4007669E+03 | 1.3894135E+02 | 8.2663763E+01 | −3.3196273E+03 | 6.8966446E+01 |
| A22 = | | | | 7.7297846E+02 | −2.1010829E+01 |
| A24 = | | | | | 3.7691910E+00 |
| A26 = | | | | | −3.0107835E−01 |

In the 2nd embodiment, the equation of the aspheric surface profiles of the aforementioned lens elements is the same as the equation of the 1 st embodiment. Also, the definitions of these parameters shown in the table below are the same as those stated in the 1st embodiment with corresponding values for the 2nd embodiment, so an explanation in this regard will not be provided again.

Moreover, these parameters can be calculated from TABLE 2A and TABLE 2B and satisfy the conditions stated in TABLE 2C below.

TABLE 2C

| | | | |
|---|---|---|---|
| f [mm] | 1.37 | TL/f | 2.32 |
| Fno | 1.75 | TL/ImgH | 1.93 |
| HFOV [deg.] | 69.0 | R2/R3 | 1.23 |
| (V2 + V4)/(V3 + V5) | 2.61 | R4/CT2 | −3.87 |
| V4/V5 | 2.88 | R6/f | 2.62 |
| (CT2 + CT4)/(CT1 + CT3 + CT5) | 1.66 | R9/f | −0.52 |
| (CT4 + CT5)/T45 | 2.14 | (f3 + f5)/f4 | −4.73 |
| (T12 + T45)/(T23 + T34) | 8.10 | f12/f | 1.71 |
| |CT4/R7 + CT4/R8| | 0.11 | f2/CT2 | 3.86 |
| CT4/T45 | 1.56 | Y52/Y11 | 1.29 |
| CTmax/CTmin | 3.62 | Y52/YS | 2.65 |

3rd Embodiment

Figure 3A:
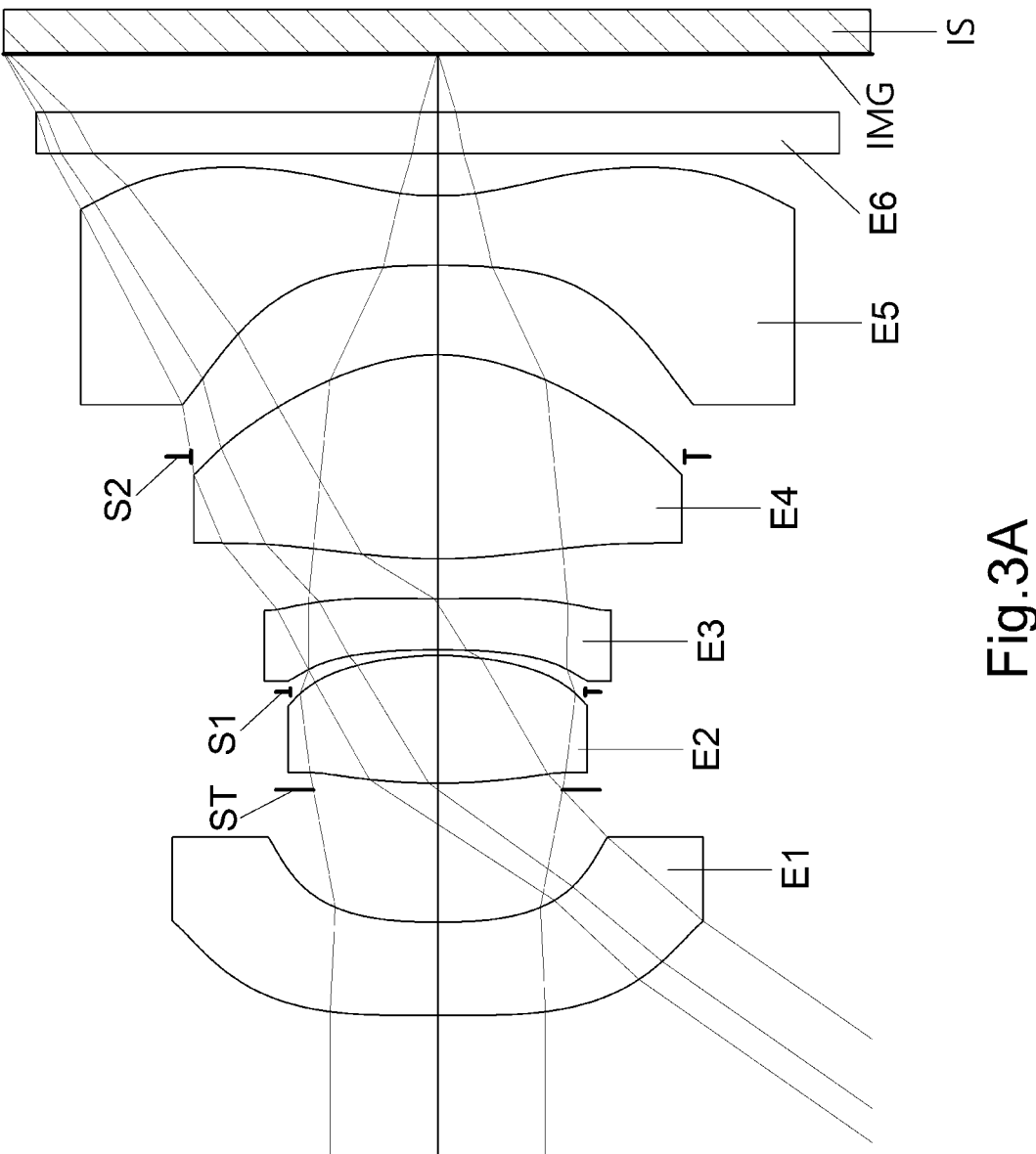
FIG. 3A is a schematic view of an imaging apparatus according to the 3rd embodiment of the present disclosure.
Figure 3B:
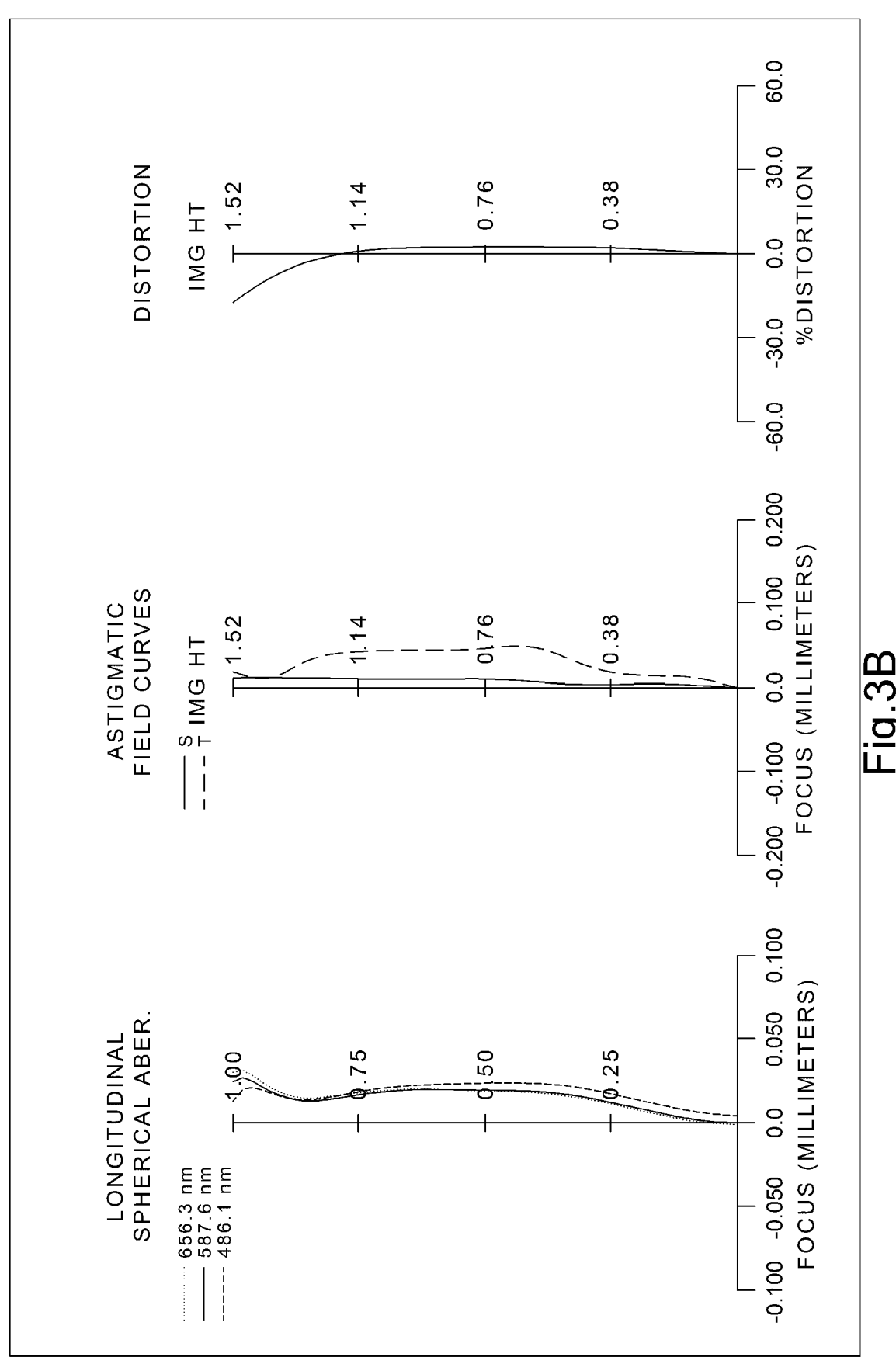
FIG. 3B shows longitudinal spherical aberration curves, astigmatic field curves and a distortion curve of the imaging apparatus according to the 3rd embodiment.

FIG. 3A is a schematic view of an imaging apparatus 3 according to the 3rd embodiment of the present disclosure. FIG. 3B shows, in order from left to right, longitudinal spherical aberration curves, astigmatic field curves and a distortion curve of the imaging apparatus according to the 3rd embodiment.

In FIG. 3A, the imaging apparatus 3 includes an optical imaging lens assembly of the present disclosure and an image sensor IS. The optical imaging lens assembly includes, in order from an object side to an image side along an optical path, a first lens element E1, an aperture stop ST, a second lens element E2, a stop S1, a third lens element E3, a fourth lens element E4, a stop S2, a fifth lens element E5, a filter E6, and an image surface IMG. The image sensor IS is disposed on or near the image surface IMG. The optical imaging lens assembly includes five lens elements (E1, E2, E3, E4 and E5), with no additional lens element disposed between the adjacent lens elements.

The first lens element E1 has negative refractive power and is made of plastic material. The first lens element E1 has an object-side surface being convex in a paraxial region thereof and having one inflection point in an off-axis region thereof, and an image-side surface being concave in a paraxial region thereof and having one inflection point in an off-axis region thereof. Both the object-side surface and the image-side surface are aspheric.

The second lens element E2 has positive refractive power and is made of plastic material. The second lens element E2 has an object-side surface being convex in a paraxial region thereof and having one inflection point in an off-axis region thereof, and an image-side surface being convex in a paraxial region thereof. Both the object-side surface and the image-side surface are aspheric.

The third lens element E3 has negative refractive power and is made of plastic material. The third lens element E3 has an object-side surface being concave in a paraxial region thereof and having one inflection point in an off-axis region thereof, and an image-side surface being concave in a paraxial region thereof and having two inflection points and one convex critical point in an off-axis region thereof. Both the object-side surface and the image-side surface are aspheric.

The fourth lens element E4 has positive refractive power and is made of plastic material. The fourth lens element E4 has an object-side surface being convex in a paraxial region thereof and having two inflection points in an off-axis region thereof, and an image-side surface being convex in a paraxial region thereof and having one inflection point in an off-axis region thereof. Both the object-side surface and the image-side surface are aspheric.

The fifth lens element E5 has negative refractive power and is made of plastic material. The fifth lens element E5 has an object-side surface being concave in a paraxial region thereof and having one inflection point in an off-axis region thereof, and an image-side surface being concave in a paraxial region thereof and having two inflection points in an off-axis region thereof. Both the object-side surface and the image-side surface are aspheric.

The filter E6 is disposed between the fifth lens element E5 and the image surface IMG. The filter E6 is made of glass material and does not affect the focal length of the optical imaging lens assembly.

The detailed optical data of the 3rd embodiment are shown in TABLE 3A, and the aspheric surface data are shown in TABLE 3B.

TABLE 3A (3rd Embodiment)
f = 1.28 mm, Fno = 1.69, HFOV = 55.0 deg.

| Surface # | | Curvature Radius | | Thickness | Material | Index | Abbe # | Focal Length |
|---|---|---|---|---|---|---|---|---|
| 0 | Object | Plano | | 450.000 | | | | |
| 1 | Lens 1 | 112.20240 | (ASP) | 0.329 | Plastic | 1.587 | 28.3 | −3.64 |
| 2 | | 2.09386 | (ASP) | 0.468 | | | | |
| 3 | Ape. Stop | Plano | | 0.023 | | | | |
| 4 | Lens 2 | 2.34716 | (ASP) | 0.450 | Plastic | 1.544 | 56.0 | 1.60 |
| 5 | | −1.28496 | (ASP) | −0.128 | | | | |
| 6 | Stop | Plano | | 0.148 | | | | |
| 7 | Lens 3 | −4.69230 | (ASP) | 0.180 | Plastic | 1.614 | 25.6 | −3.64 |
| 8 | | 4.32480 | (ASP) | 0.139 | | | | |
| 9 | Lens 4 | 1.78736 | (ASP) | 0.720 | Plastic | 1.544 | 56.0 | 1.06 |
| 10 | | −0.72657 | (ASP) | −0.359 | | | | |
| 11 | Stop | Plano | | 0.675 | | | | |
| 12 | Lens 5 | −3.23550 | (ASP) | 0.245 | Plastic | 1.669 | 19.5 | −1.06 |
| 13 | | 0.93794 | (ASP) | 0.150 | | | | |
| 14 | Filter | Plano | | 0.145 | Glass | 1.517 | 64.2 | — |
| 15 | | Plano | | 0.205 | | | | |
| 16 | Image Surface | Plano | | — | | | | |

Reference wavelength is d-line 587.6 nm.
The effective radius of the stop (S1) on Surface #6 is 0.520 mm.
The effective radius of the stop (S2) on Surface #11 is 0.870 mm.

TABLE 3B

Aspheric Coefficient

| Surface # | 1 | 2 | 4 | 5 | 7 |
|---|---|---|---|---|---|
| k = | 0.00000E+00 | −3.14270E+01 | −1.20119E+01 | 1.82739E+00 | 3.02788E+01 |
| A4 = | 6.9738349E−01 | 1.0148161E+00 | 2.4020895E−01 | −5.5934421E−01 | −2.1420142E+00 |

TABLE 3B-continued

| Aspheric Coefficient | | | | |
|---|---|---|---|---|
| A6 = | −4.4811680E−01 | 1.9995143E+01 | −1.2349718E+00 | 4.4469090E+00 | 2.0420750E+01 |
| A8 = | −2.4033699E+00 | −3.2073572E+02 | 2.3069871E+00 | −9.5146518E+00 | −1.8930668E+02 |
| A10 = | 1.4767657E+01 | 2.8082730E+03 | −3.1526077E+02 | −1.9255697E+01 | 1.5572223E+03 |
| A12 = | −3.6956329E+01 | −1.4260716E+04 | 1.9177741E+03 | −1.6408805E+03 | −1.0806543E+04 |
| A14 = | 4.9749638E+01 | 4.2036102E+04 | −5.9837796E+03 | 1.4802033E+04 | 4.8865865E+04 |
| A16 = | −3.4665932E+01 | −6.5508441E+04 | 6.3935329E+03 | −5.0914270E+04 | −1.3131865E+05 |
| A18 = | 9.6147509E+00 | 4.1046023E+04 | | 7.9377987E+04 | 1.9781426E+05 |
| A20 = | | | | −4.6566715E+04 | −1.3192218E+05 |

| Surface # | 8 | 9 | 10 | 12 | 13 |
|---|---|---|---|---|---|
| k = | −4.34848E+01 | −3.16588E+01 | −2.06948E+00 | 3.93788E+00 | −5.92469E+00 |
| A4 = | −1.5463655E+00 | −6.1760213E−02 | 4.9076796E−01 | −5.6616527E−01 | −1.4986947E−01 |
| A6 = | 1.1893374E+00 | −2.8142479E−01 | −3.5253229E+00 | 4.0296666E+00 | −2.2271592E+00 |
| A8 = | 7.7728080E+01 | −1.5786213E+00 | 1.5590219E+01 | −6.6529592E+01 | 9.0439073E+00 |
| A10 = | −8.7094186E+02 | 2.8594559E+01 | −4.8493291E+01 | 4.2254237E+02 | −1.8959186E+01 |
| A12 = | 4.9591761E+03 | −1.5163767E+02 | 9.7511118E+01 | −1.4925869E+03 | 2.6010194E+01 |
| A14 = | −1.7075979E+04 | 4.1473002E+02 | −1.1550606E+02 | 3.2546273E+03 | −2.5552578E+01 |
| A16 = | 3.5728133E+04 | −6.4712533E+02 | 6.5599162E+01 | −4.4888175E+03 | 1.8730426E+01 |
| A18 = | −4.1403060E+04 | 5.5509397E+02 | −4.9661565E+02 | 3.8199645E+03 | −1.0278038E+01 |
| A20 = | 2.0275273E+04 | −2.0363163E+02 | −6.6718299E+00 | −1.8309349E+03 | 4.0800750E+00 |
| A22 = | | | | 3.7787499E+02 | −1.0915656E+00 |
| A24 = | | | | | 1.7403779E−01 |
| A26 = | | | | | −1.2455572E−02 |

In the 3rd embodiment, the equation of the aspheric surface profiles of the aforementioned lens elements is the same as the equation of the 1 st embodiment. Also, the definitions of these parameters shown in the table below are the same as those stated in the 1st embodiment with corresponding values for the 3rd embodiment, so an explanation in this regard will not be provided again.

Moreover, these parameters can be calculated from TABLE 3A and TABLE 3B and satisfy the conditions stated in TABLE 3C below.

TABLE 3C

| | | | |
|---|---|---|---|
| f [mm] | 1.28 | TL/f | 2.65 |
| Fno | 1.69 | TL/ImgH | 2.22 |
| HFOV [deg.] | 55.0 | R2/R3 | 0.89 |
| (V2 + V4)/(V3 + V5) | 2.49 | R4/CT2 | −2.86 |
| V4/V5 | 2.88 | R6/f | 3.38 |
| (CT2 + CT4)/(CT1 + CT3 + CT5) | 1.55 | R9/f | −2.53 |
| (CT4 + CT5)/T45 | 3.05 | (f3 + f5)/f4 | −4.45 |
| (T12 + T45)/(T23 + T34) | 5.08 | f12/f | 1.66 |
| |CT4/R7 + CT4/R8| | 0.59 | f2/CT2 | 3.55 |
| CT4/T45 | 2.28 | Y52/Y11 | 1.34 |
| CTmax/CTmin | 4.00 | Y52/YS | 2.86 |

4th Embodiment

Figure 4A:
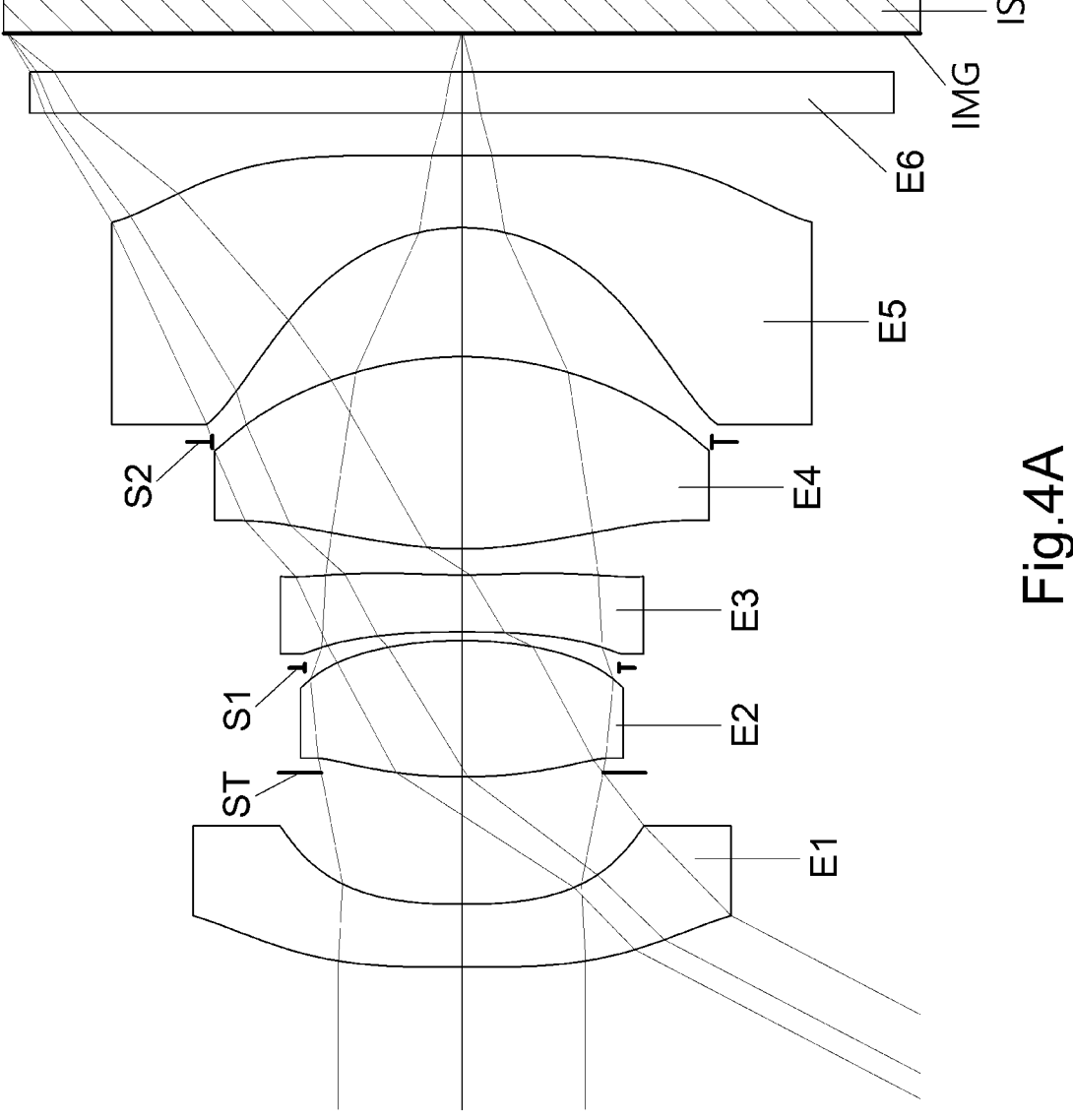
FIG. 4A is a schematic view of an imaging apparatus according to the 4th embodiment of the present disclosure.
Figure 4B:
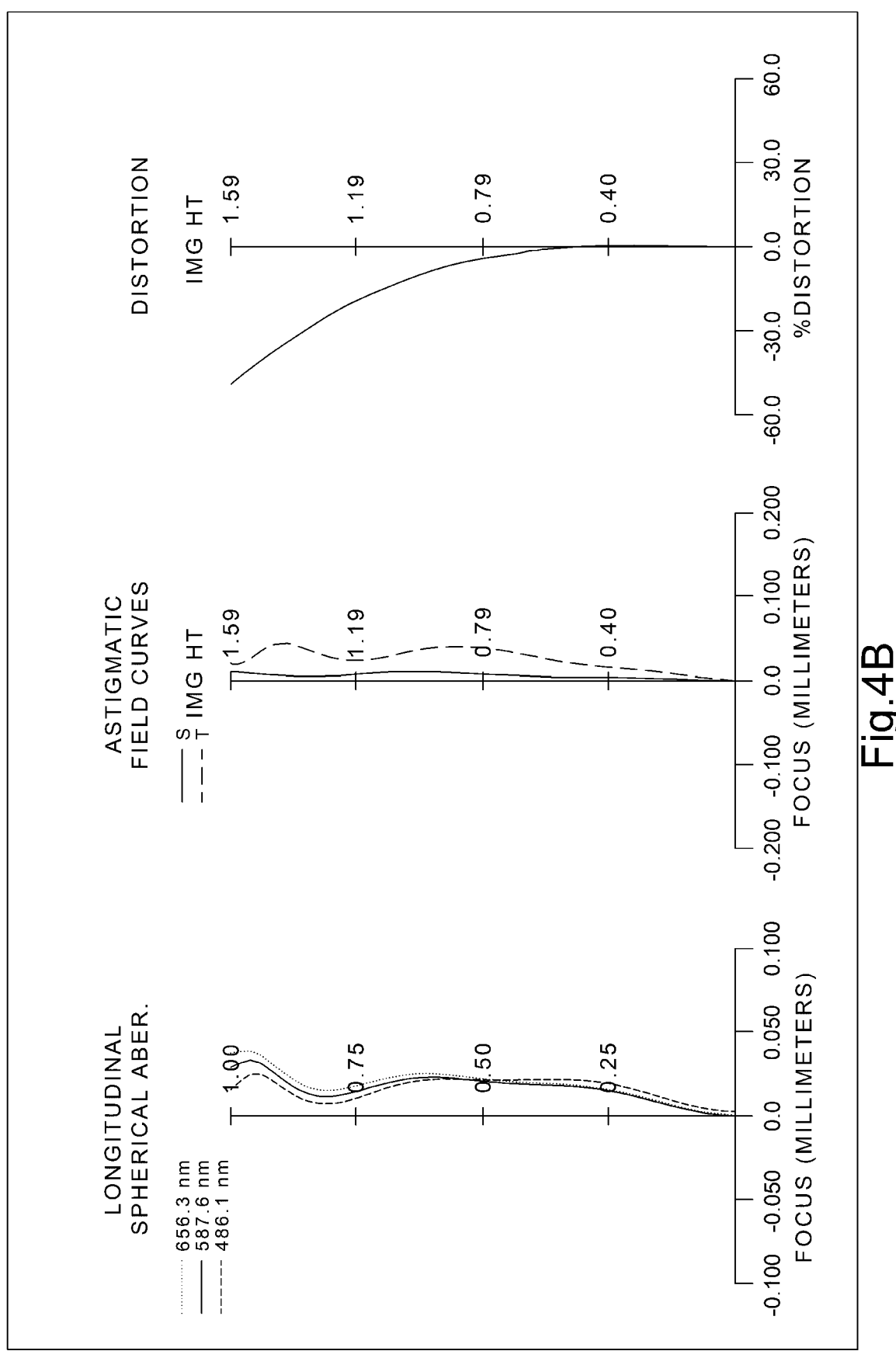
FIG. 4B shows longitudinal spherical aberration curves, astigmatic field curves and a distortion curve of the imaging apparatus according to the 4th embodiment.

FIG. 4A is a schematic view of an imaging apparatus 4 according to the 4th embodiment of the present disclosure. FIG. 4B shows, in order from left to right, longitudinal spherical aberration curves, astigmatic field curves and a distortion curve of the imaging apparatus according to the 4th embodiment.

In FIG. 4A, the imaging apparatus 4 includes an optical imaging lens assembly of the present disclosure and an image sensor IS. The optical imaging lens assembly includes, in order from an object side to an image side along an optical path, a first lens element E1, an aperture stop ST, a second lens element E2, a stop S1, a third lens element E3, a fourth lens element E4, a stop S2, a fifth lens element E5, a filter E6, and an image surface IMG. The image sensor IS is disposed on or near the image surface IMG. The optical imaging lens assembly includes five lens elements (E1, E2, E3, E4 and E5), with no additional lens element disposed between the adjacent lens elements.

The first lens element E1 has negative refractive power and is made of plastic material. The first lens element E1 has an object-side surface being convex in a paraxial region thereof and having one inflection point in an off-axis region thereof, and an image-side surface being concave in a paraxial region thereof. Both the object-side surface and the image-side surface are aspheric.

The second lens element E2 has positive refractive power and is made of plastic material. The second lens element E2 has an object-side surface being convex in a paraxial region thereof and having one inflection point in an off-axis region thereof, and an image-side surface being convex in a paraxial region thereof. Both the object-side surface and the image-side surface are aspheric.

The third lens element E3 has negative refractive power and is made of plastic material. The third lens element E3 has an object-side surface being concave in a paraxial region thereof and having one inflection point in an off-axis region thereof, and an image-side surface being concave in a paraxial region thereof and having two inflection points and one convex critical point in an off-axis region thereof. Both the object-side surface and the image-side surface are aspheric.

The fourth lens element E4 has positive refractive power and is made of plastic material. The fourth lens element E4 has an object-side surface being convex in a paraxial region thereof and having two inflection points in an off-axis region thereof, and an image-side surface being convex in a paraxial region thereof and having one inflection point in an off-axis region thereof. Both the object-side surface and the image-side surface are aspheric.

The fifth lens element E5 has negative refractive power and is made of plastic material. The fifth lens element E5 has an object-side surface being concave in a paraxial region thereof and having one inflection point in an off-axis region thereof, and an image-side surface being convex in a paraxial region thereof and having three inflection points in an off-axis region thereof. Both the object-side surface and the image-side surface are aspheric.

The filter E6 is disposed between the fifth lens element E5 and the image surface IMG. The filter E6 is made of glass material and does not affect the focal length of the optical imaging lens assembly.

The detailed optical data of the 4th embodiment are shown in TABLE 4A, and the aspheric surface data are shown in TABLE 4B.

TABLE 4A

| | | | | | | | | |
|---|---|---|---|---|---|---|---|---|
| (4th Embodiment) f = 1.60 mm, Fno = 1.85, HFOV = 62.4 deg. | | | | | | | | |
| Surface # | | Curvature Radius | | Thickness | Material | Index | Abbe # | Focal Length |
| 0 | Object | Plano | | 500.000 | | | | |
| 1 | Lens 1 | 20.35340 | (ASP) | 0.220 | Plastic | 1.545 | 56.1 | −4.45 |
| 2 | | 2.15746 | (ASP) | 0.462 | | | | |
| 3 | Ape. Stop | Plano | | −0.015 | | | | |
| 4 | Lens 2 | 1.75421 | (ASP) | 0.478 | Plastic | 1.545 | 56.1 | 1.68 |
| 5 | | −1.73055 | (ASP) | −0.095 | | | | |
| 6 | Stop | Plano | | 0.125 | | | | |
| 7 | Lens 3 | −10.78440 | (ASP) | 0.200 | Plastic | 1.669 | 19.5 | −3.15 |
| 8 | | 2.64334 | (ASP) | 0.091 | | | | |
| 9 | Lens 4 | 1.18521 | (ASP) | 0.672 | Plastic | 1.545 | 56.1 | 1.23 |
| 10 | | −1.22673 | (ASP) | −0.299 | | | | |
| 11 | Stop | Plano | | 0.752 | | | | |
| 12 | Lens 5 | −0.64174 | (ASP) | 0.251 | Plastic | 1.587 | 28.3 | −1.14 |
| 13 | | −18.88340 | (ASP) | 0.150 | | | | |
| 14 | Filter | Plano | | 0.145 | Glass | 1.517 | 64.2 | — |
| 15 | | Plano | | 0.134 | | | | |
| 16 | Image Surface | Plano | | — | | | | |

Reference wavelength is d-line 587.6 nm.
The effective radius of the stop (S1) on Surface #6 is 0.550 mm.
The effective radius of the stop (S2) on Surface #11 is 0.875 mm.

30

TABLE 4B

| | | | | | |
|---|---|---|---|---|---|
| Aspheric Coefficient | | | | | |
| Surface # | 1 | 2 | 4 | 5 | 7 |
| k = | 9.00000E+01 | −6.57354E+01 | −5.37955E+00 | 3.47726E+00 | −4.28076E+01 |
| A4 = | 6.6188743E−01 | 1.6244715E+00 | 1.9685817E−01 | −1.9763097E+00 | −3.2337743E+00 |
| A6 = | −1.2421887E+00 | 2.3788756E+00 | 6.6343533E−01 | 3.3490600E+01 | 5.0597721E+01 |
| A8 = | 2.0961293E+00 | −7.4272594E+01 | −1.8148187E+01 | −3.6980872E+02 | −5.7367932E+02 |
| A10 = | −2.4657656E+00 | 6.1729455E+02 | 1.5776214E+02 | 2.6690644E+03 | 4.4840331E+03 |
| A12 = | 9.7663816E−01 | −2.6805761E+03 | −8.0037443E+02 | −1.3280126E+04 | −2.4110391E+04 |
| A14 = | 8.7135933E−01 | 6.5399708E+03 | 1.9963163E+03 | 4.4296301E+04 | 8.6190143E+04 |
| A16 = | −1.0179448E+00 | −8.3473408E+03 | −2.1488199E+03 | −9.3797545E+04 | −1.9475807E+05 |
| A18 = | 2.8809042E−01 | 4.2701280E+03 | | 1.1321635E+05 | 2.5200046E+05 |
| A20 = | | | | −5.8993742E+04 | −1.4221168E+05 |
| Surface # | 8 | 9 | 10 | 12 | 13 |
| k = | −9.80874E+00 | −1.95490E+01 | −1.68345E+00 | −2.46377E+00 | −6.10104E+00 |
| A4 = | −2.5586321E+00 | −2.9593995E−01 | 1.8521011E−01 | −2.7622001E−01 | 6.7562633E−01 |
| A6 = | 2.1909074E+01 | 3.3381962E+00 | −1.6606927E+00 | −3.3325587E+00 | −5.5982034E+00 |
| A8 = | −1.4732220E+02 | −2.5067746E+01 | 6.7323393E+00 | −1.5980045E+00 | 2.2058787E+01 |
| A10 = | 7.3756834E+02 | 1.3004724E+02 | −1.3529740E+01 | 1.0634992E+02 | −5.9584238E+01 |
| A12 = | −2.6445963E+03 | −4.5887056E+02 | −5.4803984E+00 | −5.5323880E+02 | 1.1558086E+02 |
| A14 = | 6.5335805E+03 | 1.0584417E+03 | 8.4899618E+01 | 1.4857184E+03 | −1.6292423E+02 |
| A16 = | −1.0526672E+04 | −1.5194534E+03 | −1.6934311E+02 | −2.3504693E+03 | 1.6653588E+02 |
| A18 = | 9.9965639E+03 | 1.2208727E+03 | 1.4303293E+02 | 2.1999657E+03 | −1.2175653E+02 |
| A20 = | −4.2048185E+03 | −4.1470228E+02 | −4.4620571E+01 | −1.1258404E+03 | 6.1915855E+01 |
| A22 = | | | | 2.4243427E+02 | −2.0777861E+01 |
| A24 = | | | | | 4.1358726E+00 |
| A26 = | | | | | −3.7001405E−01 |

60

In the 4th embodiment, the equation of the aspheric surface profiles of the aforementioned lens elements is the same as the equation of the 1 st embodiment. Also, the definitions of these parameters shown in the table below are the same as those stated in the 1st embodiment with corresponding values for the 4th embodiment, so an explanation in this regard will not be provided again.

Moreover, these parameters can be calculated from TABLE 4A and TABLE 4B and satisfy the conditions stated in TABLE 4C below.

TABLE 4C

| | | | |
|---|---|---|---|
| f [mm] | 1.60 | TL/f | 2.05 |
| Fno | 1.85 | TL/ImgH | 2.06 |
| HFOV [deg.] | 62.4 | R2/R3 | 1.23 |
| (V2 + V4)/(V3 + V5) | 2.35 | R4/CT2 | -3.62 |
| V4/V5 | 1.98 | R6/f | 1.65 |
| (CT2 + CT4)/(CT1 + CT3 + CT5) | 1.71 | R9/f | -0.40 |
| (CT4 + CT5)/T45 | 2.04 | (f3 + f5)/f4 | -3.50 |
| (T12 + T45)/(T23 + T34) | 7.44 | f12/f | 1.39 |
| |CT4/R7 + CT4/R8| | 0.02 | f2/CT2 | 3.51 |
| CT4/T45 | 1.48 | Y52/Y11 | 1.30 |
| CTmax/CTmin | 3.36 | Y52/YS | 2.48 |

5th Embodiment

Figure 5A:
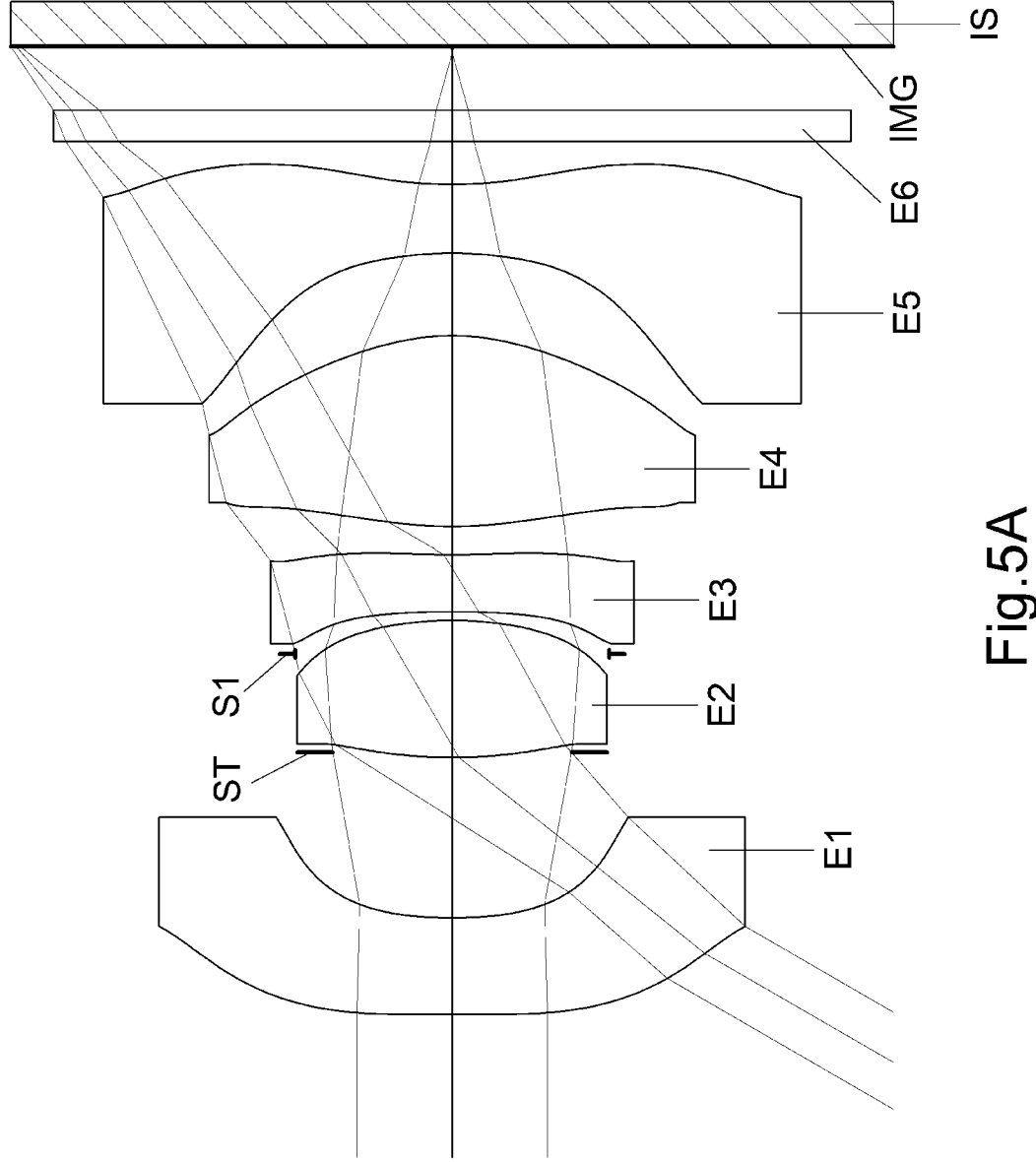
FIG. 5A is a schematic view of an imaging apparatus according to the 5th embodiment of the present disclosure.
Figure 5B:
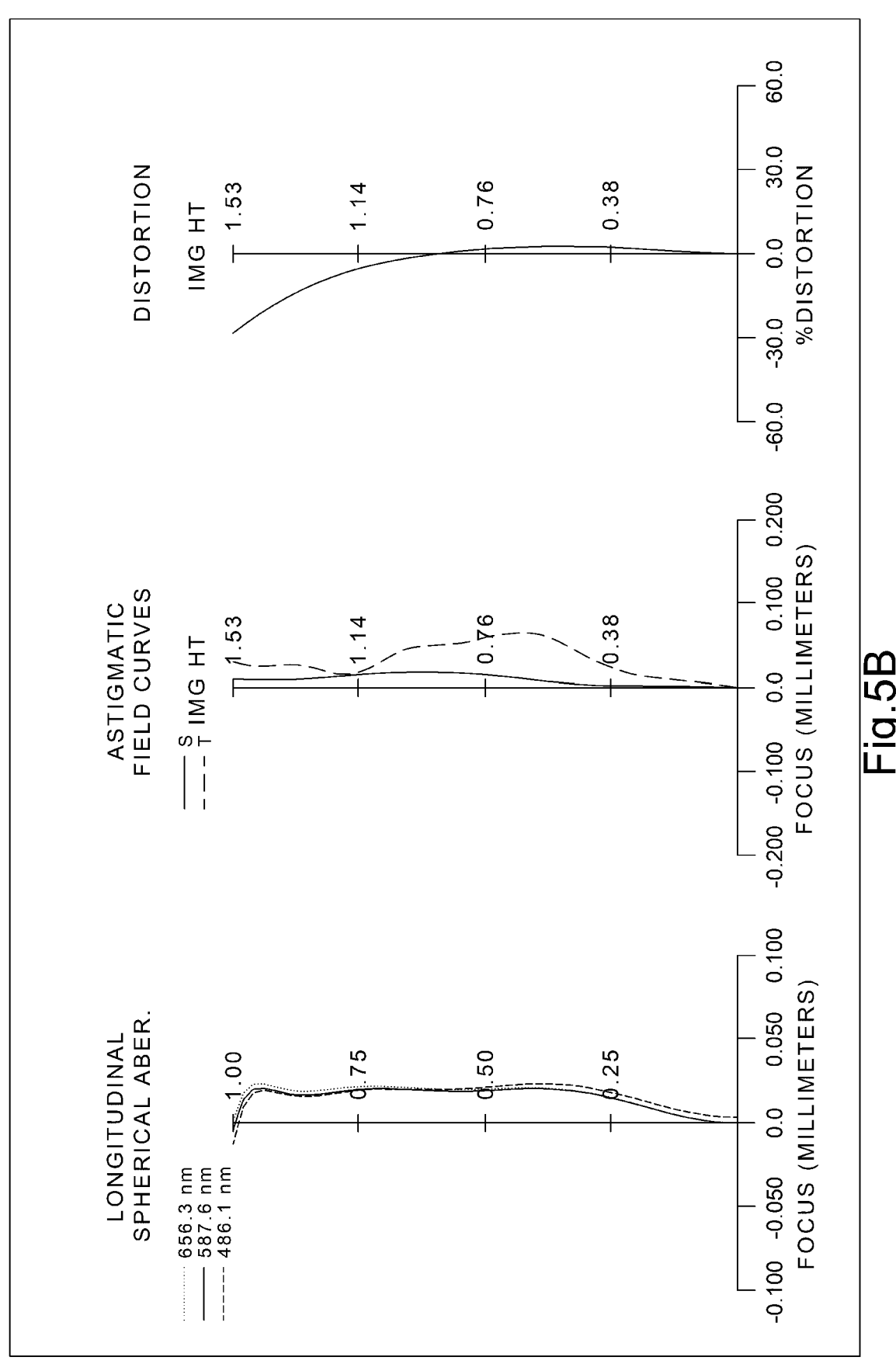
FIG. 5B shows longitudinal spherical aberration curves, astigmatic field curves and a distortion curve of the imaging apparatus according to the 5th embodiment.

FIG. 5A is a schematic view of an imaging apparatus 5 according to the 5th embodiment of the present disclosure. FIG. 5B shows, in order from left to right, longitudinal spherical aberration curves, astigmatic field curves and a distortion curve of the imaging apparatus according to the 5th embodiment.

In FIG. 5A, the imaging apparatus 5 includes an optical imaging lens assembly of the present disclosure and an image sensor IS. The optical imaging lens assembly includes, in order from an object side to an image side along an optical path, a first lens element E1, an aperture stop ST, a second lens element E2, a stop S1, a third lens element E3, a fourth lens element E4, a fifth lens element E5, a filter E6, and an image surface IMG. The image sensor IS is disposed on or near the image surface. The optical imaging lens assembly includes five lens elements (E1, E2, E3, E4 and E5), with no additional lens element disposed between the adjacent lens elements.

The first lens element E1 has negative refractive power and is made of plastic material. The first lens element E1 has an object-side surface being concave in a paraxial region thereof and having two inflection points in an off-axis region thereof, and an image-side surface being concave in a paraxial region thereof and having one inflection point in an off-axis region thereof. Both the object-side surface and the image-side surface are aspheric.

The second lens element E2 has positive refractive power and is made of glass material. The second lens element E2 has an object-side surface being convex in a paraxial region thereof and having one inflection point in an off-axis region thereof, and an image-side surface being convex in a paraxial region thereof. Both the object-side surface and the image-side surface are aspheric.

The third lens element E3 has negative refractive power and is made of plastic material. The third lens element E3 has an object-side surface being concave in a paraxial region thereof and having one inflection point in an off-axis region thereof, and an image-side surface being concave in a paraxial region thereof and having two inflection points and one convex critical point in an off-axis region thereof. Both the object-side surface and the image-side surface are aspheric.

The fourth lens element E4 has positive refractive power and is made of plastic material. The fourth lens element E4 has an object-side surface being convex in a paraxial region thereof and having two inflection points in an off-axis region thereof, and an image-side surface being convex in a paraxial region thereof and having one inflection point in an off-axis region thereof. Both the object-side surface and the image-side surface are aspheric.

The fifth lens element E5 has negative refractive power and is made of plastic material. The fifth lens element E5 has an object-side surface being concave in a paraxial region thereof and having one inflection point in an off-axis region thereof, and an image-side surface being concave in a paraxial region thereof and having two inflection points in an off-axis region thereof. Both the object-side surface and the image-side surface are aspheric.

The filter E6 is disposed between the fifth lens element E5 and the image surface IMG. The filter E6 is made of glass material and does not affect the focal length of the optical imaging lens assembly.

The detailed optical data of the 5th embodiment are shown in TABLE 5A, and the aspheric surface data are shown in TABLE 5B.

TABLE 5A (5th Embodiment)
f = 1.22 mm, Fno = 1.83, HFOV = 59.9 deg.

| Surface # | | Curvature Radius | | Thickness | Material | Index | Abbe # | Focal Length |
|---|---|---|---|---|---|---|---|---|
| 0 | Object | Plano | | 450.000 | | | | |
| 1 | Lens 1 | -59.29780 | (ASP) | 0.339 | Plastic | 1.545 | 56.1 | -2.80 |
| 2 | | 1.57080 | (ASP) | 0.580 | | | | |
| 3 | Ape. Stop | Plano | | -0.018 | | | | |
| 4 | Lens 2 | 1.74754 | (ASP) | 0.480 | Glass | 1.589 | 61.2 | 1.36 |
| 5 | | -1.32175 | (ASP) | -0.117 | | | | |
| 6 | Stop | Plano | | 0.147 | | | | |
| 7 | Lens 3 | -5.33670 | (ASP) | 0.200 | Plastic | 1.650 | 21.8 | -2.74 |
| 8 | | 2.71633 | (ASP) | 0.097 | | | | |
| 9 | Lens 4 | 1.32332 | (ASP) | 0.669 | Plastic | 1.544 | 56.0 | 1.03 |
| 10 | | -0.79697 | (ASP) | 0.289 | | | | |
| 11 | Lens 5 | -1.26257 | (ASP) | 0.241 | Plastic | 1.614 | 25.6 | -1.11 |
| 12 | | 1.59917 | (ASP) | 0.150 | | | | |
| 13 | Filter | Plano | | 0.110 | Glass | 1.517 | 64.2 | — |
| 14 | | Plano | | 0.223 | | | | |
| 15 | Image Surface | Plano | | — | | | | |

Reference wavelength is d-line 587.6 nm.
The effective radius of the stop (S1) on Surface #6 is 0.550 mm.

TABLE 5B

| | | | Aspheric Coefficient | | |
|---|---|---|---|---|---|
| Surface # | 1 | 2 | 4 | 5 | 7 |
| k = | 0.00000E+00 | −3.15362E+01 | −9.15387E+00 | 1.73864E+00 | 3.73383E+01 |
| A4 = | 6.9790748E−01 | 1.7366730E+00 | 2.9064255E−01 | 5.8815558E−02 | −1.5857784E+00 |
| A6 = | −9.1771124E−01 | 9.8059729E+00 | −2.0976099E+00 | −1.2397012E+01 | 1.1812480E+01 |
| A8 = | 8.1863209E−01 | −1.8157605E+02 | 2.3326080E+01 | 2.2303042E+02 | −6.5347571E+01 |
| A10 = | 5.6857042E−01 | 1.5759946E+03 | −3.2403625E+02 | −2.2341317E+03 | 6.0837882E+01 |
| A12 = | −2.4300794E+00 | −7.7547099E+03 | 2.6539393E+03 | 1.2266122E+04 | 9.8693705E+02 |
| A14 = | 2.7804945E+00 | 2.2227725E+04 | −1.2328606E+04 | −3.9247612E+04 | −6.8489689E+03 |
| A16 = | −1.5894290E+00 | −3.3837891E+04 | 2.1947970E+04 | 7.2747056E+04 | 2.2448328E+04 |
| A18 = | 3.7484204E−01 | 2.0704067E+04 | | −7.3557085E+04 | −3.3950868E+04 |
| A20 = | | | | 3.4044042E+04 | 1.7389394E+04 |

| Surface # | 8 | 9 | 10 | 11 | 12 |
|---|---|---|---|---|---|
| k = | −2.33135E+01 | −2.60403E+01 | −2.59087E+00 | −2.57301E+00 | 0.00000E+00 |
| A4 = | −2.0289942E+00 | 3.1326188E−02 | 6.5144107E−01 | 7.2022105E−01 | 7.4850105E−01 |
| A6 = | 1.2882396E+01 | −1.4701076E+00 | −5.5491359E+00 | −7.4311785E+00 | −1.1547470E+01 |
| A8 = | −7.1216604E+01 | 1.0360655E+01 | 3.0719525E+01 | −1.1561914E+01 | 5.6568981E+01 |
| A10 = | 3.3950155E+02 | −4.6312206E+01 | −1.2050804E+02 | 2.7317036E+02 | −1.7555438E+02 |
| A12 = | −1.4378818E+03 | 1.3996604E+02 | 3.1280607E+02 | −1.3385080E+03 | 3.7593533E+02 |
| A14 = | 4.6685850E+03 | −3.0289296E+02 | −5.0987734E+02 | 3.5690573E+03 | −5.6937622E+02 |
| A16 = | −9.9199968E+03 | 4.2019016E+02 | 4.8638909E+02 | −5.7797522E+03 | 6.1285728E+02 |
| A18 = | 1.2115758E+04 | −3.0498418E+02 | −2.4042439E+02 | 5.6668665E+03 | −4.6480606E+02 |
| A20 = | −6.3756862E+03 | 8.2146090E+01 | 4.6067860E+01 | −3.0930565E+03 | 2.4238069E+02 |
| A22 = | | | | 7.2048514E+02 | −8.2616542E+01 |
| A24 = | | | | | 1.6560219E+01 |
| A26 = | | | | | −1.4795609E+00 |

In the 5th embodiment, the equation of the aspheric surface profiles of the aforementioned lens elements is the same as the equation of the 1 st embodiment. Also, the definitions of these parameters shown in the table below are the same as those stated in the 1st embodiment with corresponding values for the 5th embodiment, so an explanation in this regard will not be provided again.

Moreover, these parameters can be calculated from TABLE 5A and TABLE 5B and satisfy the conditions stated in TABLE 5C below.

TABLE 5C

| f [mm] | 1.22 | TL/f | 2.78 |
|---|---|---|---|
| Fno | 1.83 | TL/ImgH | 2.22 |
| HFOV [deg.] | 59.9 | R2/R3 | 0.90 |
| (V2 + V4)/(V3 + V5) | 2.48 | R4/CT2 | −2.75 |
| V4/V5 | 2.19 | R6/f | 2.22 |
| (CT2 + CT4)/(CT1 + CT3 + CT5) | 1.47 | R9/f | −1.03 |
| (CT4 + CT5)/T45 | 3.15 | (f3 + f5)/f4 | −3.75 |
| (T12 + T45)/(T23 + T34) | 6.70 | f12/f | 1.42 |
| |CT4/R7 + CT4/R8| | 0.33 | f2/CT2 | 2.83 |
| CT4/T45 | 2.31 | Y52/Y11 | 1.19 |
| CTmax/CTmin | 3.35 | Y52/YS | 2.93 |

6th Embodiment

Figure 6A:
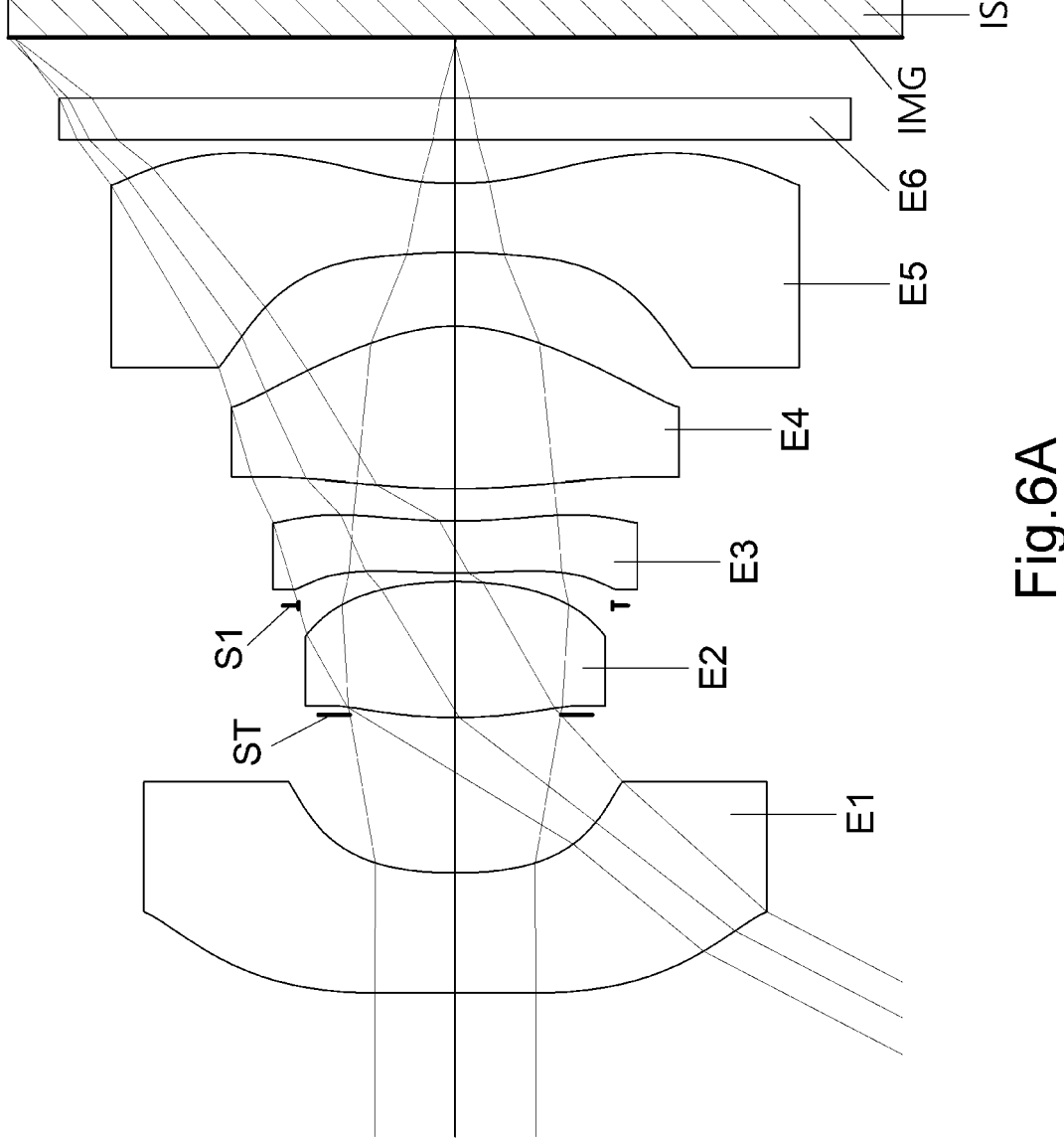
FIG. 6A is a schematic view of an imaging apparatus according to the 6th embodiment of the present disclosure.
Figure 6B:
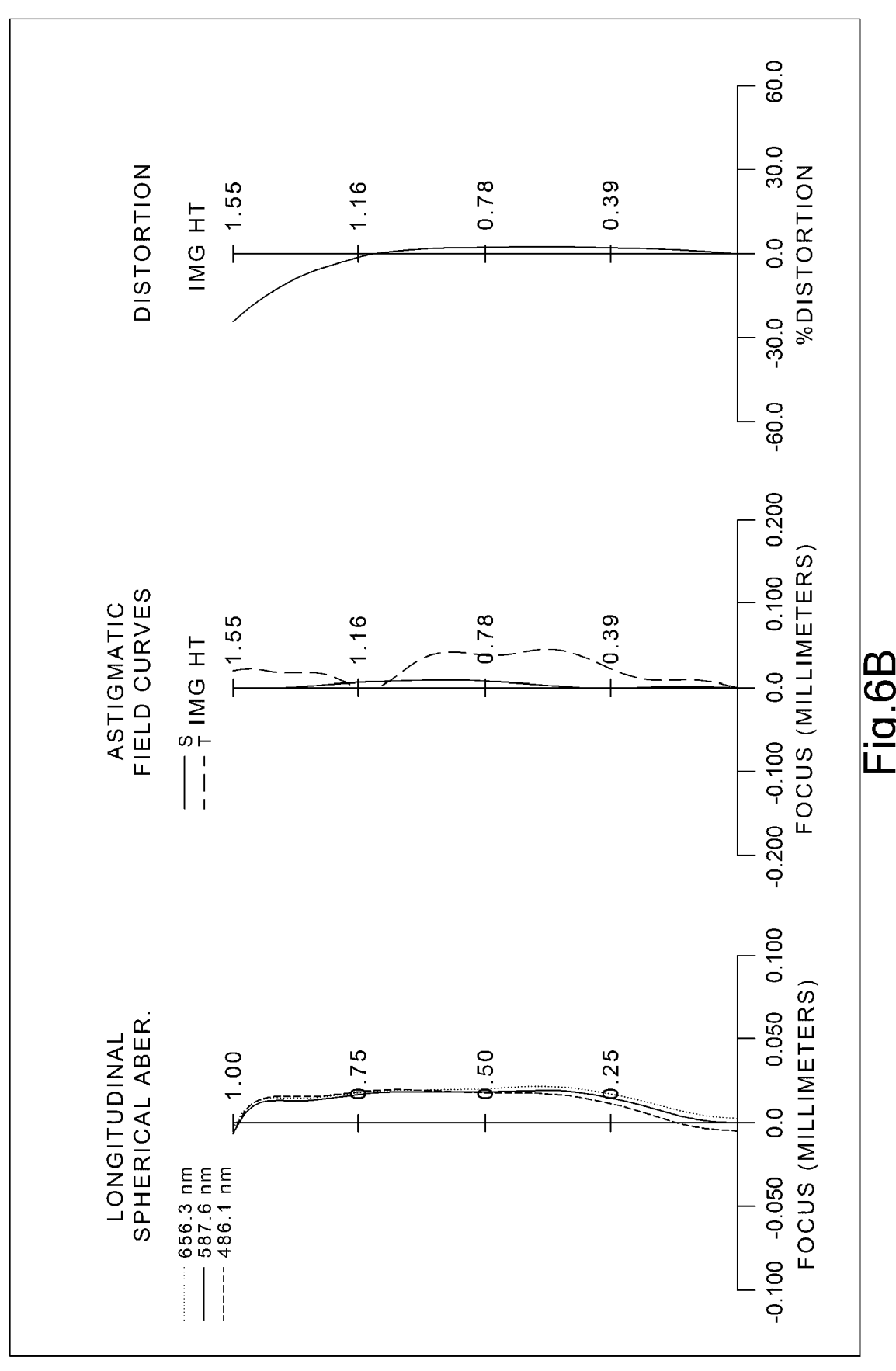
FIG. 6B shows longitudinal spherical aberration curves, astigmatic field curves and a distortion curve of the imaging apparatus according to the 6th embodiment.

FIG. 6A is a schematic view of an imaging apparatus 6 according to the 6th embodiment of the present disclosure. FIG. 6B shows, in order from left to right, longitudinal spherical aberration curves, astigmatic field curves and a distortion curve of the imaging apparatus according to the 6th embodiment.

In FIG. 6A, the imaging apparatus 6 includes an optical imaging lens assembly of the present disclosure and an image sensor IS. The optical imaging lens assembly includes, in order from an object side to an image side along an optical path, a first lens element E1, an aperture stop ST, a second lens element E2, a stop S1, a third lens element E3, a fourth lens element E4, a fifth lens element E5, a filter E6, and an image surface IMG. The image sensor IS is disposed on or near the image surface IMG. The optical imaging lens assembly includes five lens elements (E1, E2, E3, E4 and E5), with no additional lens element disposed between the adjacent lens elements.

The first lens element E1 has negative refractive power and is made of plastic material. The first lens element E1 has an object-side surface being concave in a paraxial region thereof and having two inflection points in an off-axis region thereof, and an image-side surface being concave in a paraxial region thereof and having one inflection point in an off-axis region thereof. Both the object-side surface and the image-side surface are aspheric.

The second lens element E2 has positive refractive power and is made of plastic material. The second lens element E2 has an object-side surface being convex in a paraxial region thereof and having one inflection point in an off-axis region thereof, and an image-side surface being convex in a paraxial region thereof. Both the object-side surface and the image-side surface are aspheric.

The third lens element E3 has negative refractive power and is made of plastic material. The third lens element E3 has an object-side surface being convex in a paraxial region thereof and having two inflection points in an off-axis region thereof, and an image-side surface being concave in a paraxial region thereof and having two inflection points and one convex critical point in an off-axis region thereof. Both the object-side surface and the image-side surface are aspheric.

The fourth lens element E4 has positive refractive power and is made of plastic material. The fourth lens element E4 has an object-side surface being convex in a paraxial region thereof and having one inflection point in an off-axis region thereof, and an image-side surface being convex in a paraxial region thereof and having one inflection point in an off-axis region thereof. Both the object-side surface and the image-side surface are aspheric.

The fifth lens element E5 has negative refractive power and is made of plastic material. The fifth lens element E5 has an object-side surface being concave in a paraxial region thereof and having one inflection point in an off-axis region thereof, and an image-side surface being concave in a paraxial region thereof and having two inflection points in an off-axis region thereof. Both the object-side surface and the image-side surface are aspheric.

The filter E6 is disposed between the fifth lens element E5 and the image surface IMG. The filter E6 is made of glass material and does not affect the focal length of the optical imaging lens assembly.

The detailed optical data of the 6th embodiment are shown in TABLE 6A, and the aspheric surface data are shown in TABLE 6B.

TABLE 6A (6th Embodiment)
f = 1.05 mm, Fno = 1.88, HFOV = 62.5 deg.

| Surface # | | Curvature Radius | | Thickness | Material | Index | Abbe # | Focal Length |
|---|---|---|---|---|---|---|---|---|
| 0 | Object | Plano | | 400.000 | | | | |
| 1 | Lens 1 | −7.06280 | (ASP) | 0.416 | Plastic | 1.545 | 56.1 | −2.19 |
| 2 | | 1.46975 | (ASP) | 0.549 | | | | |
| 3 | Ape. Stop | Plano | | −0.010 | | | | |
| 4 | Lens 2 | 1.65229 | (ASP) | 0.472 | Plastic | 1.544 | 56.0 | 1.48 |
| 5 | | −1.40546 | (ASP) | −0.083 | | | | |
| 6 | Stop | Plano | | 0.113 | | | | |
| 7 | Lens 3 | 2.57829 | (ASP) | 0.180 | Plastic | 1.705 | 14.0 | −8.56 |
| 8 | | 1.75442 | (ASP) | 0.112 | | | | |
| 9 | Lens 4 | 2.62622 | (ASP) | 0.563 | Plastic | 1.544 | 56.0 | 1.00 |
| 10 | | −0.63364 | (ASP) | 0.256 | | | | |
| 11 | Lens 5 | −1.77147 | (ASP) | 0.240 | Plastic | 1.639 | 23.5 | −1.14 |
| 12 | | 1.29510 | (ASP) | 0.150 | | | | |
| 13 | Filter | Plano | | 0.145 | Glass | 1.517 | 64.2 | — |
| 14 | | Plano | | 0.211 | | | | |
| 15 | Image Surface | Plano | | — | | | | |

Reference wavelength is d-line 587.6 nm.
The effective radius of the stop (S1) on Surface #6 is 0.545 mm.

TABLE 6B

Aspheric Coefficient

| Surface # | 1 | 2 | 4 | 5 | 7 |
|---|---|---|---|---|---|
| k = | 0.00000E+00 | −2.86429E+01 | −1.25943E+01 | 2.27027E+00 | 0.00000E+00 |
| A4 = | 7.5077834E−01 | 2.2333224E+00 | −1.0095526E−02 | −3.2872567E−01 | −1.3510294E+00 |
| A6 = | −1.2601139E+00 | 7.0855609E+00 | 1.5215761E+01 | −3.1624596E+01 | −1.6369035E+01 |
| A8 = | 1.7769380E+00 | −1.9560532E+02 | −4.3535096E+02 | 6.9973104E+02 | 4.2542278E+02 |
| A10 = | −1.2204927E+00 | 2.0571744E+03 | 5.9781531E+03 | −8.1571767E+03 | −4.9978307E+03 |
| A12 = | −3.4937222E−01 | −1.1757859E+04 | −4.4902407E+04 | 5.6920098E+04 | 3.4401741E+04 |
| A14 = | 1.3108483E+00 | 3.8454548E+04 | 1.7020362E+05 | −2.4684579E+05 | −1.4521019E+05 |
| A16 = | −9.2557712E−01 | −6.6135258E+04 | −2.5485213E+05 | 6.4848780E+05 | 3.6420601E+05 |
| A18 = | 2.2246328E−01 | 4.5463236E+04 | | −9.4519334E+05 | −4.9157420E+05 |
| A20 = | | | | 5.9033478E+05 | 2.7244942E+05 |

| Surface # | 8 | 9 | 10 | 11 | 12 |
|---|---|---|---|---|---|
| k = | −1.54430E+01 | −4.13675E+01 | −3.39128E+00 | −6.25441E+00 | 0.00000E+00 |
| A4 = | −5.8820450E−01 | 2.3249742E−01 | 5.2929555E−01 | 1.9755016E+00 | 1.6163840E+00 |
| A6 = | −7.4678358E+00 | −4.3506287E+00 | −4.5903244E+00 | −1.5903783E+01 | −2.1501987E+01 |
| A8 = | 1.2560686E+02 | 3.3423800E+01 | 1.9212427E+01 | 6.1039757E+00 | 1.1121066E+02 |
| A10 = | −1.0532619E+03 | −1.6086335E+02 | −3.5664657E+01 | 3.7415180E+02 | −3.6804323E+02 |
| A12 = | 5.3182495E+03 | 4.7396045E+02 | −1.4004253E+01 | −2.1355080E+03 | 8.4326862E+02 |
| A14 = | −1.6696639E+04 | −8.2678843E+02 | 2.0206472E+02 | 6.0271236E+03 | −1.3705686E+03 |
| A16 = | 3.1674377E+04 | 7.5941333E+02 | −4.0374676E+02 | −1.0023581E+04 | 1.5865226E+03 |
| A18 = | −3.3015262E+04 | −2.1729762E+02 | 3.6096868E+02 | 9.9476765E+03 | −1.2959363E+03 |
| A20 = | 1.4506892E+04 | −9.0696536E+01 | −1.2470929E+02 | −5.4427620E+03 | 7.2864051E+02 |
| A22 = | | | | 1.2603935E+03 | −2.6805388E+02 |
| A24 = | | | | | 5.8051761E+01 |
| A26 = | | | | | −5.6100072E+00 |

In the 6th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 6th embodiment, so an explanation in this regard will not be provided again.

Moreover, these parameters can be calculated from TABLE 6A and TABLE 6B and satisfy the conditions stated in TABLE 6C below.

TABLE 6C

| | | | |
|---|---|---|---|
| f [mm] | 1.05 | TL/f | 3.16 |
| Fno | 1.88 | TL/ImgH | 2.14 |
| HFOV [deg.] | 62.5 | R2/R3 | 0.89 |
| (V2 + V4)/(V3 + V5) | 2.98 | R4/CT2 | −2.98 |
| V4/V5 | 2.38 | R6/f | 1.67 |
| (CT2 + CT4)/(CT1 + CT3 + CT5) | 1.24 | R9/f | −1.69 |
| (CT4 + CT5)/T45 | 3.14 | (f3 + f5)/f4 | −9.71 |
| (T12 + T45)/(T23 + T34) | 5.60 | f12/f | 2.09 |
| |CT4/R7 + CT4/R8| | 0.67 | f2/CT2 | 3.13 |
| CT4/T45 | 2.20 | Y52/Y11 | 1.11 |
| CTmax/CTmin | 3.13 | Y52/YS | 3.26 |

7th Embodiment

Figure 7A:
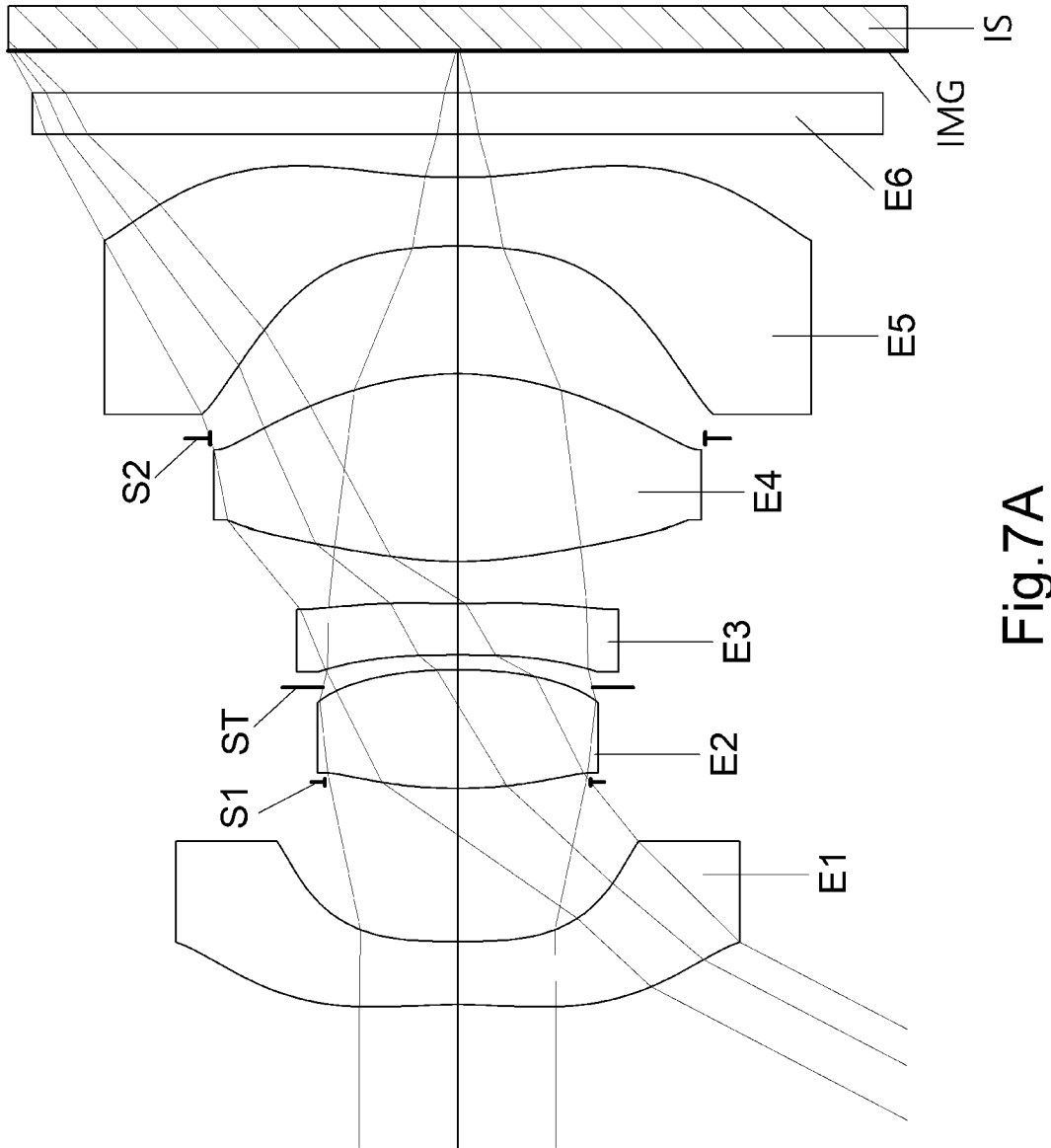
FIG. 7A is a schematic view of an imaging apparatus according to the 7th embodiment of the present disclosure.
Figure 7B:
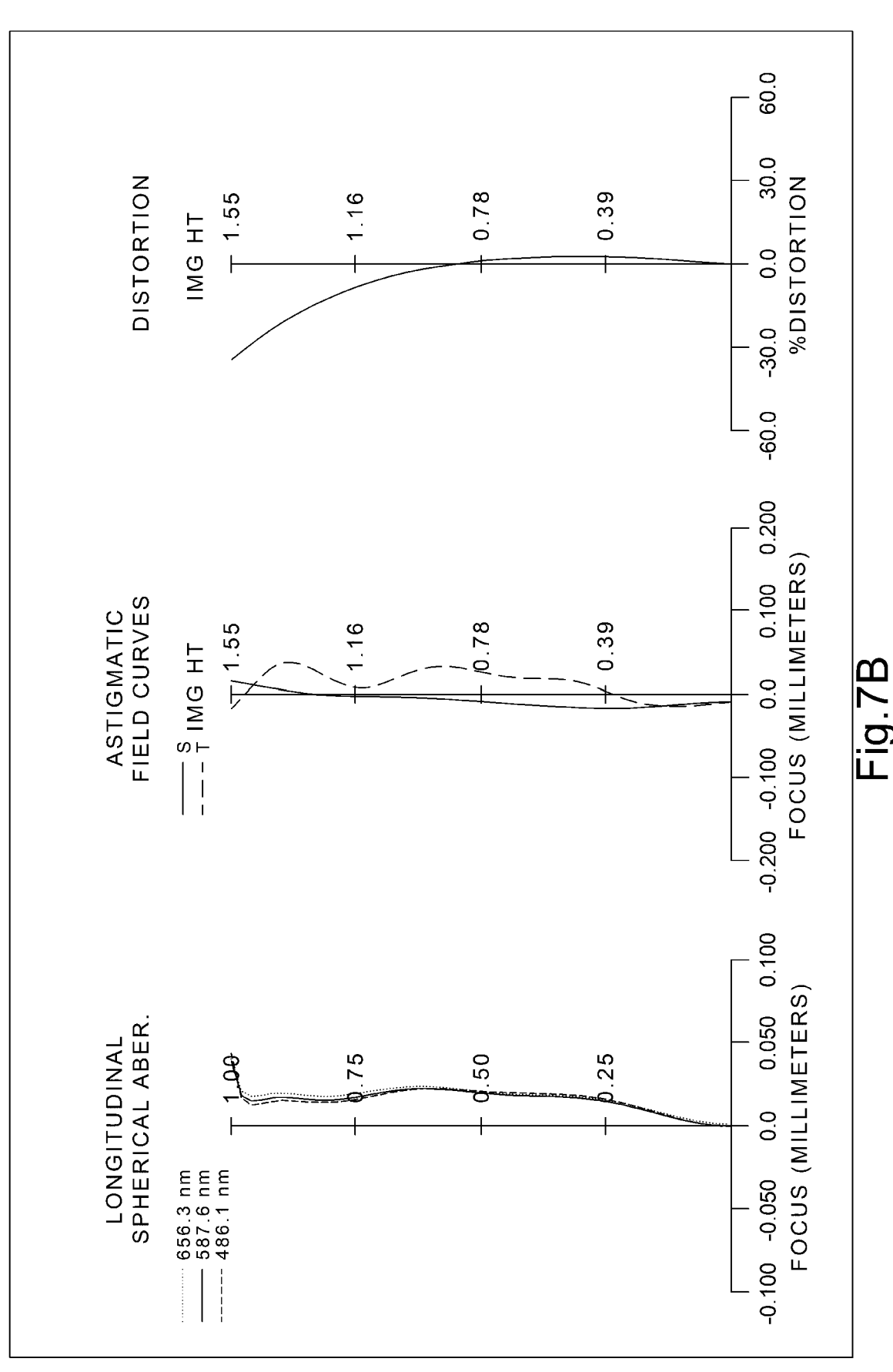
FIG. 7B shows longitudinal spherical aberration curves, astigmatic field curves and a distortion curve of the imaging apparatus according to the 7th embodiment.

FIG. 7A is a schematic view of an imaging apparatus 7 according to the 7th embodiment of the present disclosure. FIG. 7B shows, in order from left to right, longitudinal spherical aberration curves, astigmatic field curves and a distortion curve of the imaging apparatus according to the 7th embodiment.

In FIG. 7A, the imaging apparatus 7 includes an optical imaging lens assembly of the present disclosure and an image sensor IS. The optical imaging lens assembly includes, in order from an object side to an image side along an optical path, a first lens element E1, a stop S1, a second lens element E2, an aperture stop ST, a third lens element E3, a fourth lens element E4, a stop S2, a fifth lens element E5, a filter E6, and an image surface IMG. The image sensor IS is disposed on or near the image surface IMG. The optical imaging lens assembly includes five lens elements (E1, E2, E3, E4 and E5), with no additional lens element disposed between the adjacent lens elements.

The first lens element E1 has negative refractive power and is made of plastic material. The first lens element E1 has an object-side surface being concave in a paraxial region thereof and having two inflection points in an off-axis region thereof, and an image-side surface being concave in a paraxial region thereof and having one inflection point in an off-axis region thereof. Both the object-side surface and the image-side surface are aspheric.

The second lens element E2 has positive refractive power and is made of plastic material. The second lens element E2 has an object-side surface being convex in a paraxial region thereof and having one inflection point in an off-axis region thereof, and an image-side surface being convex in a paraxial region thereof. Both the object-side surface and the image-side surface are aspheric.

The third lens element E3 has negative refractive power and is made of plastic material. The third lens element E3 has an object-side surface being concave in a paraxial region thereof, and an image-side surface being concave in a paraxial region thereof and having two inflection points and one convex critical point in an off-axis region thereof. Both the object-side surface and the image-side surface are aspheric.

The fourth lens element E4 has positive refractive power and is made of plastic material. The fourth lens element E4 has an object-side surface being convex in a paraxial region thereof, and an image-side surface being convex in a paraxial region thereof and having one inflection point in an off-axis region thereof. Both the object-side surface and the image-side surface are aspheric.

The fifth lens element E5 has negative refractive power and is made of plastic material. The fifth lens element E5 has an object-side surface being concave in a paraxial region thereof and having one inflection point in an off-axis region thereof, and an image-side surface being concave in a paraxial region thereof and having two inflection points in an off-axis region thereof. Both the object-side surface and the image-side surface are aspheric.

The filter E6 is disposed between the fifth lens element E5 and the image surface IMG. The filter E6 is made of glass material and does not affect the focal length of the optical imaging lens assembly.

The detailed optical data of the 7th embodiment are shown in TABLE 7A, and the aspheric surface data are shown in TABLE 7B.

TABLE 7A (7th Embodiment)
f = 1.23 mm, Fno = 1.79, HFOV = 62.5 deg.

| Surface # | | Curvature Radius | | Thickness | Material | Index | Abbe # | Focal Length |
|---|---|---|---|---|---|---|---|---|
| 0 | Object | Plano | | Infinity | | | | |
| 1 | Lens 1 | −2.28255 | (ASP) | 0.220 | Plastic | 1.551 | 44.5 | −2.46 |
| 2 | | 3.45960 | (ASP) | 0.558 | | | | |
| 3 | Stop | Plano | | −0.022 | | | | |
| 4 | Lens 2 | 1.65226 | (ASP) | 0.415 | Plastic | 1.544 | 56.0 | 1.70 |
| 5 | | −1.91287 | (ASP) | −0.062 | | | | |
| 6 | Ape. Stop | Plano | | 0.113 | | | | |
| 7 | Lens 3 | −12.60790 | (ASP) | 0.180 | Plastic | 1.686 | 18.4 | −5.31 |
| 8 | | 5.15530 | (ASP) | 0.147 | | | | |
| 9 | Lens 4 | 1.32624 | (ASP) | 0.654 | Plastic | 1.544 | 56.0 | 1.21 |
| 10 | | −1.07345 | (ASP) | −0.226 | | | | |
| 11 | Stop | Plano | | 0.673 | | | | |
| 12 | Lens 5 | −1.71796 | (ASP) | 0.240 | Plastic | 1.686 | 18.4 | −1.35 |
| 13 | | 2.12743 | (ASP) | 0.150 | | | | |
| 14 | Filter | Plano | | 0.145 | Glass | 1.517 | 64.2 | — |
| 15 | | Plano | | 0.146 | | | | |

TABLE 7A-continued (7th Embodiment)
f = 1.23 mm, Fno = 1.79, HFOV = 62.5 deg.

| Surface # | | Curvature Radius | Thickness | Material | Index | Abbe # | Focal Length |
|---|---|---|---|---|---|---|---|
| 16 | Image Surface | Plano | — | | | | |

Reference wavelength is d-line 587.6 nm.
The effective radius of the stop (S1) on Surface #3 is 0.465 mm.
The effective radius of the stop (S2) on Surface #11 is 0.865 mm.

TABLE 7B

Aspheric Coefficient

| Surface # | 1 | 2 | 4 | 5 | 7 |
|---|---|---|---|---|---|
| k = | −9.00000E+01 | −9.07056E+00 | −7.65397E+00 | 4.34007E+00 | 9.00000E+01 |
| A4 = | 9.3035410E−01 | 1.8694812E+00 | 4.7597478E−01 | −1.4474031E+00 | −3.0360438E+00 |
| A6 = | −8.4429737E−01 | 6.4224844E+00 | −8.5757972E+00 | 1.0601700E+01 | 3.7755198E+01 |
| A8 = | −2.5103081E+00 | −1.1364784E+02 | 1.3231175E+02 | −3.0572138E+01 | −4.7503869E+02 |
| A10 = | 1.2448114E+01 | 8.9364359E+02 | −1.2301317E+03 | −3.0484060E+02 | 4.9091509E+03 |
| A12 = | −2.3650501E+01 | −4.0513385E+03 | 6.1206867E+03 | 2.8179143E+03 | −3.5622886E+04 |
| A14 = | 2.3418372E+01 | 1.1012076E+04 | −1.5565904E+04 | −8.5805180E+03 | 1.6808407E+05 |
| A16 = | −1.2002345E+01 | −1.6245560E+04 | 1.4851366E+04 | 3.4656389E+03 | −4.9052247E+05 |
| A18 = | 2.5174837E+00 | 9.7142375E+03 | | 2.9604053E+04 | 8.0861086E+05 |
| A20 = | | | | −3.9263671E+04 | −5.7944972E+05 |

| Surface # | 8 | 9 | 10 | 12 | 13 |
|---|---|---|---|---|---|
| k = | 3.03822E+01 | −1.77916E+01 | −2.76877E+00 | −4.96821E−01 | −9.01072E+00 |
| A4 = | −2.0724352E+00 | −1.2168139E−01 | 3.2877258E−01 | −4.6308506E−01 | 4.3801251E−01 |
| A6 = | 1.0092819E+01 | 7.1938031E−01 | −4.2651323E+00 | 2.2966130E+00 | −6.6130139E+00 |
| A8 = | −1.4130115E+01 | −4.6725204E+00 | 3.0041040E+01 | −6.4077136E+01 | 2.8511253E+01 |
| A10 = | −1.8976009E+02 | 2.5078758E+01 | −1.3400833E+02 | 4.5894911E+02 | −7.6969510E+01 |
| A12 = | 1.6877623E+03 | −8.0300299E+01 | 3.6847888E+02 | −1.7443180E+03 | 1.4336102E+02 |
| A14 = | −6.8695301E+03 | 1.4669533E+02 | −6.1312695E+02 | 4.0244808E+03 | −1.8971471E+02 |
| A16 = | 1.5424476E+04 | −1.4701463E+02 | 5.9304982E+02 | −5.7995144E+03 | 1.7924435E+02 |
| A18 = | −1.7547511E+04 | 7.3429007E+01 | −3.0120991E+02 | 5.0989700E+03 | −1.1961138E+02 |
| A20 = | 7.1646701E+03 | −1.3524126E+01 | 6.1004394E+01 | −2.4998752E+03 | 5.4852463E+01 |
| A22 = | | | | 5.2322004E+02 | −1.6388142E+01 |
| A24 = | | | | | 2.8629289E+00 |
| A26 = | | | | | −2.2123438E−01 |

In the 7th embodiment, the equation of the aspheric surface profiles of the aforementioned lens elements is the same as the equation of the 1st embodiment. Also, the definitions of these parameters shown in the table below are the same as those stated in the 1st embodiment with corresponding values for the 7th embodiment, so an explanation in this regard will not be provided again.

Moreover, these parameters can be calculated from TABLE 7A and TABLE 7B and satisfy the conditions stated in TABLE 7C below.

TABLE 7C

| f [mm] | 1.23 | TL/f | 2.71 |
|---|---|---|---|
| Fno | 1.79 | TL/ImgH | 2.15 |
| HFOV [deg.] | 62.5 | R2/R3 | 2.09 |
| (V2 + V4)/(V3 + V5) | 3.05 | R4/CT2 | −4.61 |
| V4/V5 | 3.05 | R6/f | 4.19 |
| (CT2 + CT4)/(CT1 + CT3 + CT5) | 1.67 | R9/f | −1.40 |
| (CT4 + CT5)/T45 | 2.00 | (f3 + f5)/f4 | −5.52 |
| (T12 + T45)/(T23 + T34) | 4.96 | f12/f | 2.25 |
| |CT4/R7 + CT4/R8| | 0.12 | f2/CT2 | 4.09 |
| CT4/T45 | 1.46 | Y52/Y11 | 1.25 |
| CTmax/CTmin | 3.63 | Y52/YS | 2.62 |

8th Embodiment

Figure 9:
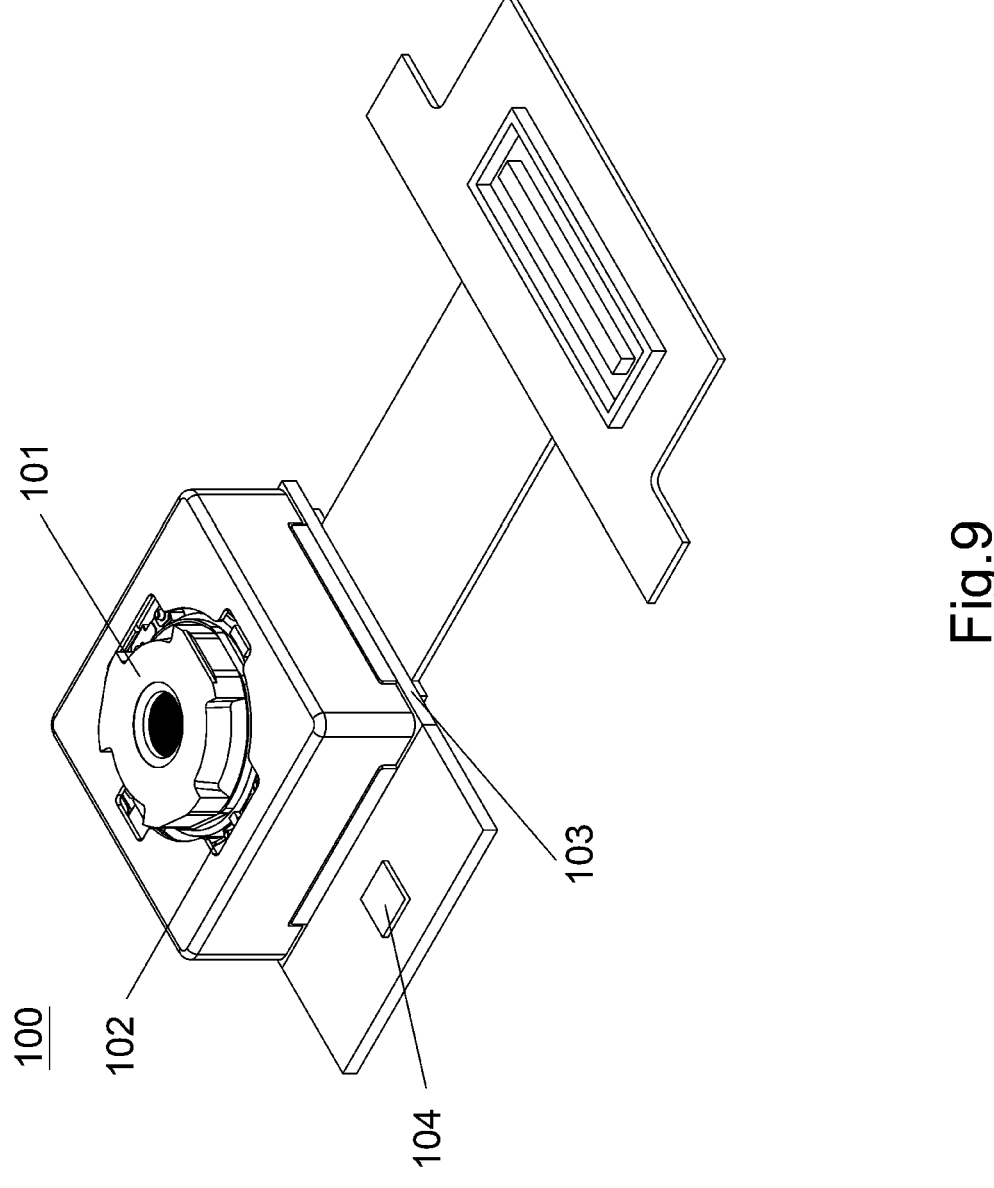
FIG. 9 is a 3-dimensional schematic view of an imaging apparatus according to the 1st embodiment of the present disclosure.

Please refer to FIG. 9. FIG. 9 is a 3-dimensional schematic view of an imaging apparatus 100 according to the 8th embodiment of the present disclosure. In the present embodiment, the imaging apparatus 100 is a camera module. The imaging apparatus 100 includes an imaging lens assembly 101, a driving device 102, and an image sensor 103. The imaging lens assembly 101 includes the optical imaging lens assembly of the 1st embodiment described above, a lens barrel (not otherwise herein labeled) for carrying the optical imaging lens assembly, and a supporting device (not otherwise herein labeled). The imaging lens assembly 101 may alternatively be configured with an optical imaging lens assembly from the other embodiments described above. The imaging apparatus 100 obtains an image from light convergence in the imaging lens assembly 101, and achieves focusing by the driving device 102 so as to form the image on the image sensor 103 (the image sensor IS in the 1st embodiment), and outputs the image data thereafter.

The driving device 102 may be an auto-focus module that can be driven by a voice coil motor (VCM), a micro electro-mechanical system (MEMS), a piezoelectric system, shape memory alloys or other driving systems. The driving device 102 allows the imaging lens assembly 101 to obtain a better imaging position so as to obtain a clear image at different object distances.

The imaging apparatus 100 may be equipped with an image sensor 103 (e.g., CMOS, CCD) with high sensitivity and low noise on the image surface to provide accurate and satisfactory image quality from the imaging lens assembly 101.

In addition, the imaging apparatus 100 may further include an image stabilizer 104, which may be a motion sensing element such as an accelerometer, a gyro sensor or a Hall Effect sensor. The image stabilizer 104 in the 9th embodiment is a gyro sensor but is not limited thereto. By adjusting the imaging lens assembly 101 in different axial directions to provide compensation for image blurs due to motion during exposures, the image quality under dynamic and low-light circumstances can be further improved, and enhanced image compensation functions such as optical image stabilization (QIS) or electronic image stabilization (EIS) can also be provided.

The imaging apparatus 100 of the present disclosure is not limited to being applied to smartphones. The imaging apparatus 100 may be used in focus adjusting systems depending on the needs, while it features excellent aberration correction and provides satisfactory image quality. For example, the imaging apparatus 100 may be applied to a variety of applications such as car electronics, drones, smart electronic products, tablet computers, wearable devices, medical devices, precision instruments, surveillance cameras, portable video recorders, identification systems, multi-lens devices, somatosensory detections, virtual reality, motion devices, home intelligent auxiliary systems and other electronic devices.

9th Embodiment

Figure 10A:
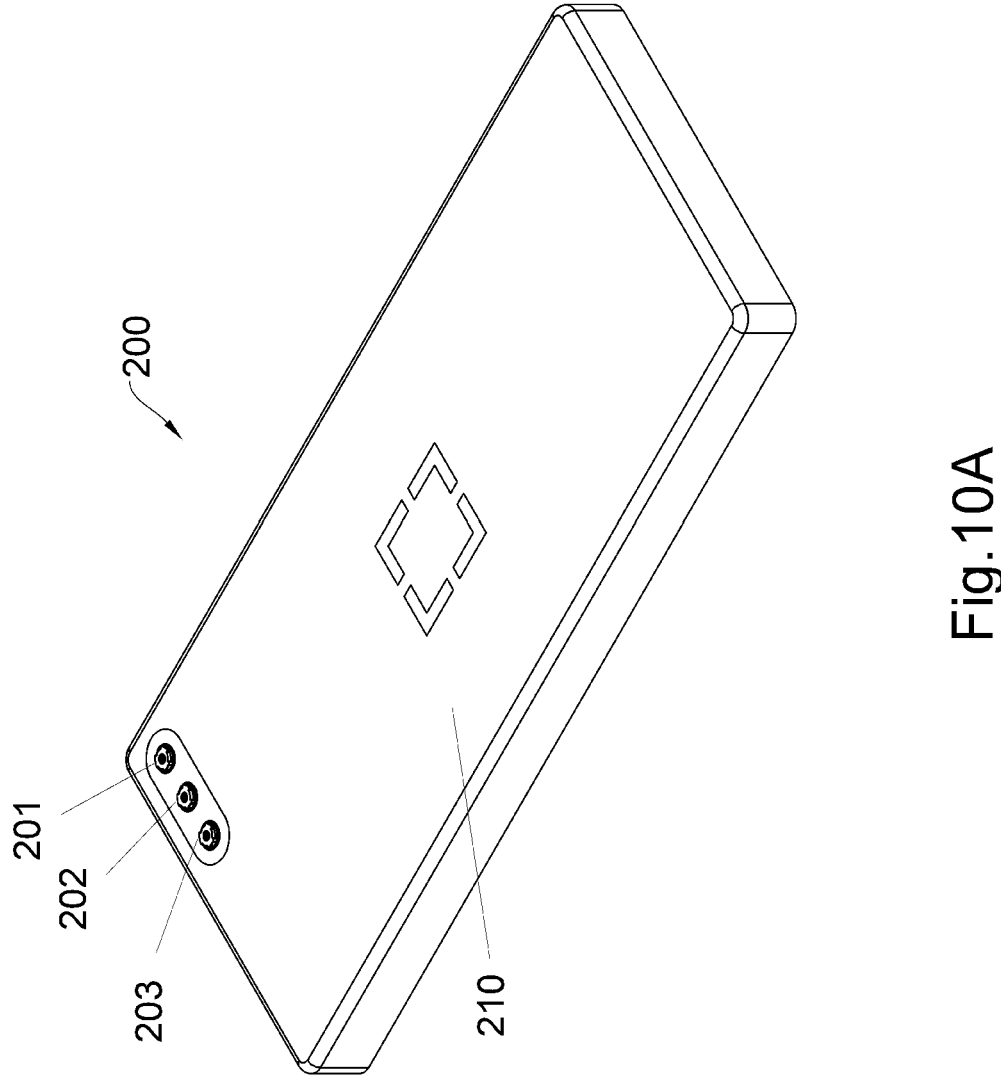
FIG. 10A is a front view of an electronic device according to the 8th embodiment of the present disclosure.
Figure 10B:
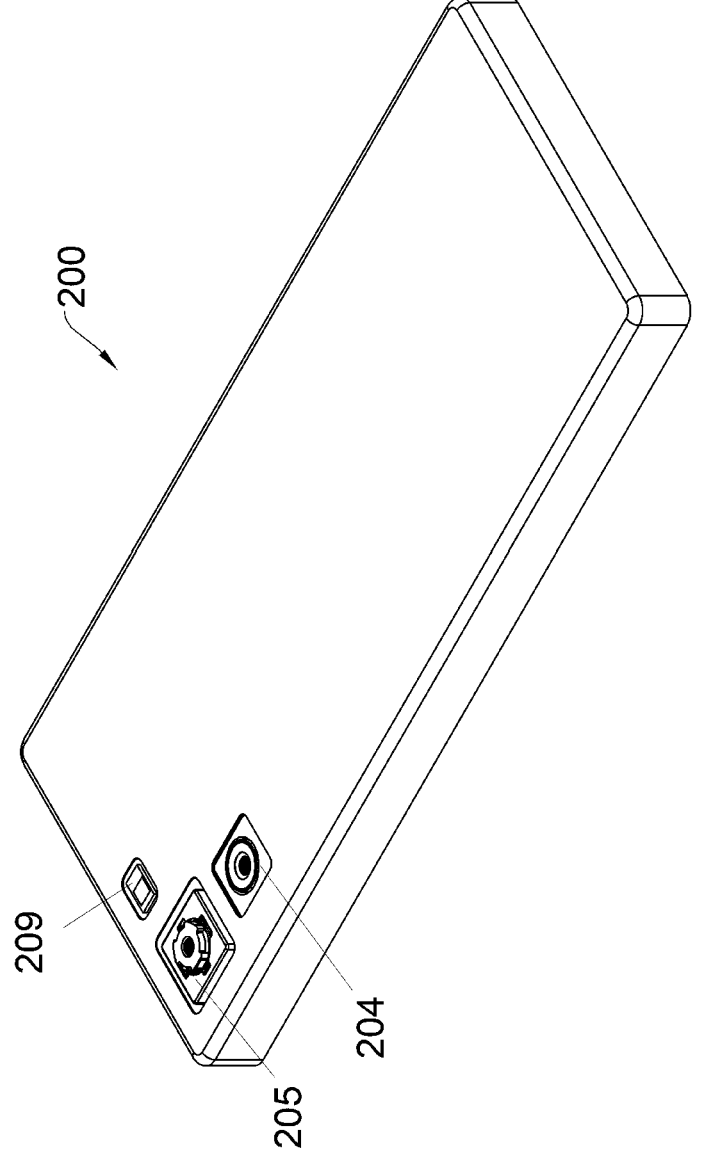
FIG. 10B is a rear view of an electronic device according to the 8th embodiment of the present disclosure.

Please refer to FIG. 10A and FIG. 10B. FIG. 10A is a front view of an electronic device 200 according to the 9th embodiment. FIG. 10B is a rear view of the electronic device 200 shown in FIG. 10A.

In this embodiment, the electronic device 200 is a smartphone. The electronic device 200 comprises imaging apparatuses 201, 202, 203, 204, 205, a flash module 209, a focus assist module, an image signal processor, an image software processor, and a display module 210. The imaging apparatuses 201, 202, 203 and the display module 210 are disposed on the same side of the electronic device 200; moreover, the display module 210 may be a user interface, so that the imaging apparatuses 201, 202 and 203 can serve as front-facing cameras to provide a self-portrait function, but is not limited thereto. The imaging apparatuses 204 and 205 are disposed on the opposite side of the electronic device 200. The focus assist module may use a laser ranging sensor module or a time-of-flight (ToF) module, but is not limited thereto. The imaging apparatuses 201, 202, 203, 204 and 205 may each include an optical imaging lens assembly of the present disclosure and may each have the same or similar structure and configuration as the imaging apparatus 100 of the 8th embodiment. More specifically, the imaging apparatuses 201, 202, 203, 204 and 205 may each include an imaging lens assembly, a driving device, an image sensor and an image stabilizer, and may each include a reflective element for folding the optical path. Further, the imaging lens assembly of each of the imaging apparatuses 201, 202, 203, 204 and 205 may include, for example, an optical imaging lens assembly of the present disclosure, a lens barrel for carrying the optical imaging lens assembly, and a supporting device.

The imaging apparatuses 201 and 205 are each in a wide-angle configuration, the imaging apparatuses 202 and 204 are each in an ultra-wide-angle configuration, and the imaging apparatus 203 is in a ToF configuration. In this embodiment, the imaging apparatuses 201 and 202 have different fields of view, and the imaging apparatuses 204 and 205 have different fields of view, so that the electronic device 200 can provide different magnifications to achieve an optical zoom effect. Moreover, the imaging apparatus 203 can obtain depth information of an image. The electronic device 200 includes multiple imaging apparatuses 201, 202, 203, 204 and 205 as an example, but the number and configuration of the imaging apparatuses described in the present disclosure should not be construed in a limiting sense.

When the user takes a photograph of an object, the electronic device 200 uses at least one of the imaging apparatuses 204 and 205 to have light rays converge so as to obtain an image, and can activate the flash module 209 for light supplement. Information on the distance of the object provided by the focus assist module can be used to achieve fast auto-focusing, and the image signal processor performs image optimization to further enhance the quality of the image produced by the optical imaging lens assembly. The focus assist module may adopt an infrared or laser focus assist system to achieve fast focusing. In addition, the electronic device 200 may also use at least one of the imaging apparatuses 201, 202 and 203 to take photographs. The display module 210 may adopt a touch screen that works with diverse functions of the image software processor to perform photo taking and image processing (or a physical button may be used for photo taking). The image processed by the image software processor can be displayed on the display module 210.

10th Embodiment

Figure 11:
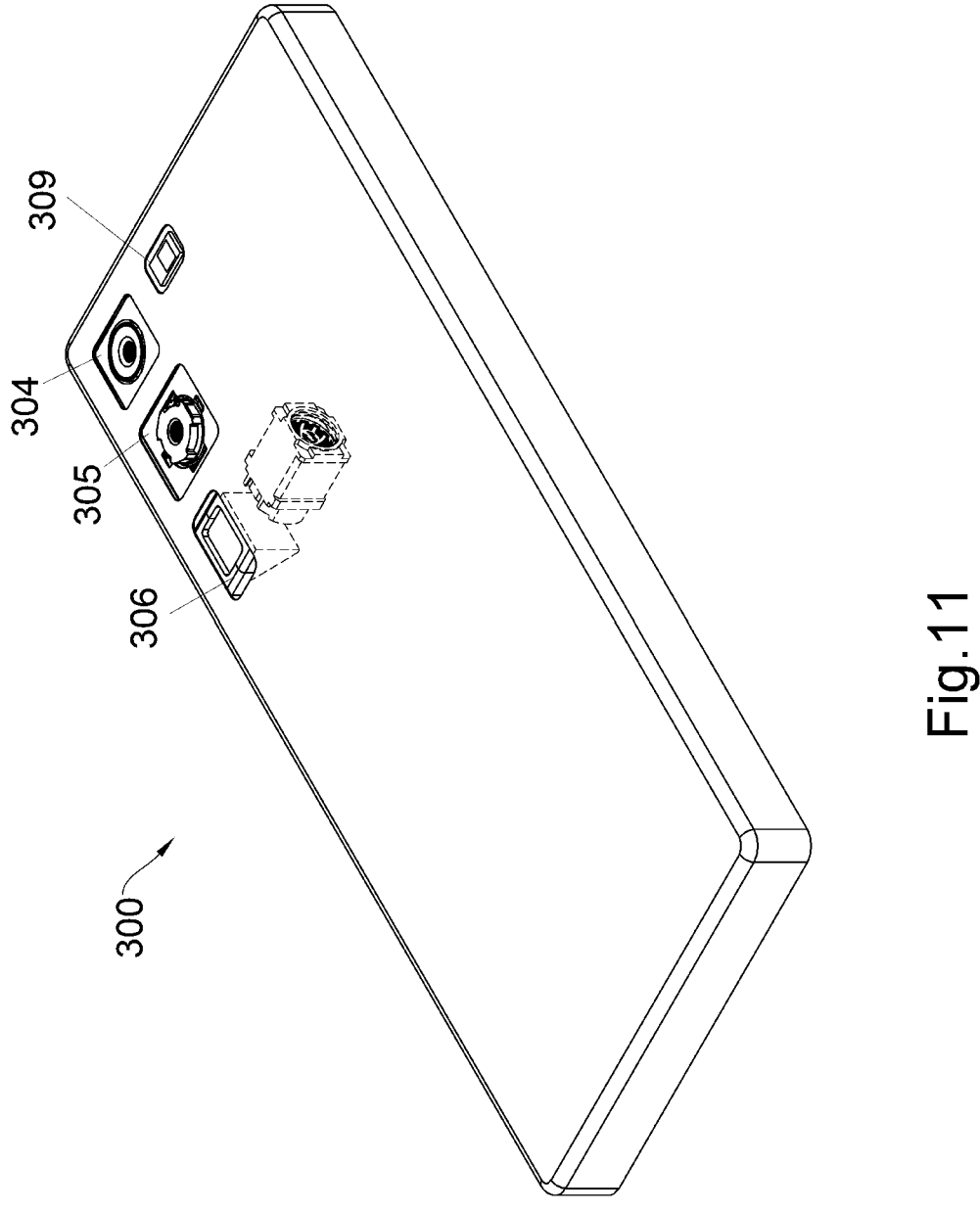
FIG. 11 is a rear view of an electronic device according to the 9th embodiment of the present disclosure.

Please refer to FIG. 11. FIG. 11 is a rear view of an electronic device 300 according to the 10th embodiment.

In this embodiment, the electronic device 300 is a smartphone. The electronic device 300 comprises imaging apparatuses 304, 305, 306, a flash module 309, a focus assist module, an image signal processor, a display module and an image software processor (not shown). The imaging apparatuses 304, 305, 306 and the flash module 309 are disposed on the same side of the electronic device 300, while the display module is disposed on the opposite side of the electronic device 300. The imaging apparatuses 304, 305 and 306 may each include an optical imaging lens assembly of the present disclosure and may each have the same or similar structure and configuration as the imaging apparatus 100 of the 8th embodiment. Explanations in this regard will not be repeated here.

The imaging apparatus 304 is in an ultra-wide-angle configuration, the imaging apparatus 305 is in a wide-angle configuration, and the imaging apparatus 306 is in a telephoto configuration. In this embodiment, the imaging apparatuses 304, 305 and 306 have different fields of view, so that the electronic device 300 can provide different magnifications to achieve an optical zoom effect. In addition, the imaging apparatus 306, which is in a telephoto configuration, is provided with a reflective element capable of folding the optical path, so that the total track length of the imaging apparatus 306 is not limited by the thickness of the electronic device 300. The electronic device 300 includes multiple imaging apparatuses 304, 305 and 306 as an example, but the number and configuration of the imaging apparatuses described in the present disclosure should not be construed in a limiting sense. When the user takes a photograph of an object, the electronic device 300 uses at least one of the imaging apparatuses 304, 305 and 306 to have light rays converge so as to obtain an image, and can activate the flash module 309 for light supplement. The following process is similar to that described in the previous embodiment and will not be repeated here.

11th Embodiment

Figure 12:
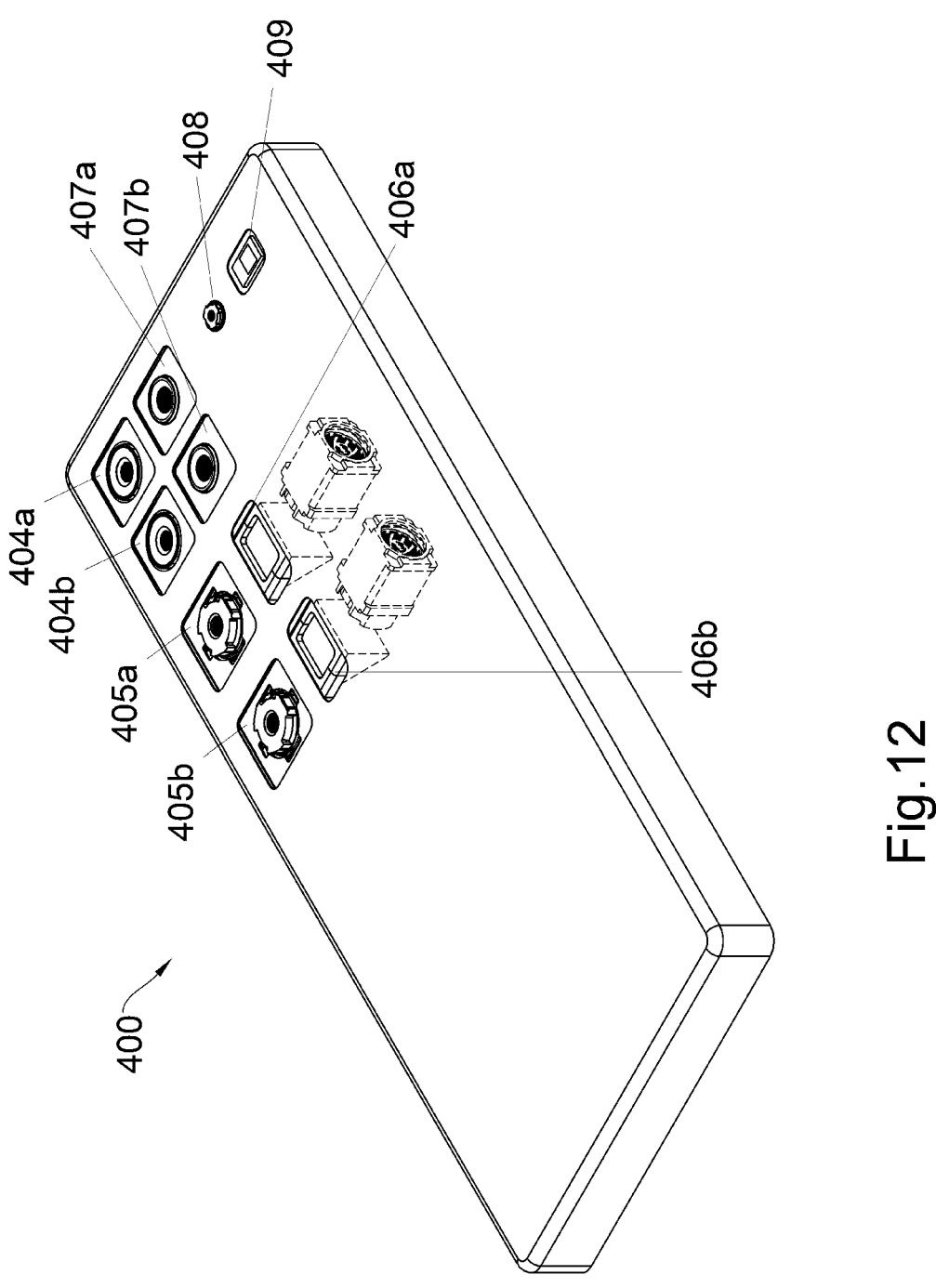
FIG. 12 is a rear view of an electronic device according to the 10th embodiment of the present disclosure.

Please refer to FIG. 12. FIG. 12 is a rear view of an electronic device 400 according to the 11th embodiment.

In this embodiment, the electronic device 400 is a smartphone. The electronic device 400 comprises imaging apparatuses 404a, 404b, 405a, 405b, 406a, 406b, 407a, 407b, 408, a flash module 409, a focus assist module, an image signal processor, a display module and an image software processor (not shown). The imaging apparatuses 404a, 404b, 405a, 405b, 406a, 406b, 407a, 407b, 408 and the flash module 409 are disposed on the same side of the electronic device 400, while the display module is disposed on the opposite side of the electronic device 400. The imaging apparatuses 404a, 404b, 405a, 405b, 406a, 406b, 407a, 407b and 408 may each include an optical imaging lens assembly of the present disclosure and may each have the same or similar structure and configuration as the imaging apparatus 100 of the 8th embodiment. Explanations in this regard will not be repeated here.

The imaging apparatuses 404a and 404b are each in an ultra-wide-angle configuration, the imaging apparatuses 405a and 405b are each in a wide-angle configuration, the imaging apparatuses 406a, 406b, 407a and 407b are each in a telephoto configuration, and the imaging apparatus 408 is in a ToF configuration. In this embodiment, the imaging apparatuses 404a, 404b, 405a, 405b, 406a, 406b, 407a and 407b have different fields of view, so that the electronic device 400 can provide different magnifications to achieve an optical zoom effect. In addition, the imaging apparatuses 406a and 406b, both in a telephoto configuration, may each be provided with a reflective element capable of folding the optical path. Moreover, the imaging apparatus 408 can obtain depth information of an image. The electronic device 400 includes multiple imaging apparatuses 404a, 404b, 405a, 405b, 406a, 406b, 407a, 407b and 408 as an example, but the number and configuration of the imaging apparatuses described in the present disclosure should not be construed in a limiting sense. When the user takes a photograph of an object, the electronic device 400 uses at least one of the imaging apparatuses 404a, 404b, 405a, 405b, 406a, 406b, 407a, 407b and 408 to have light rays converge so as to obtain an image, and can activate the flash module 409 for light supplement. The following process is similar to that described in the previous embodiment and will not be repeated here.

What is claimed is:

1. An optical imaging lens assembly comprising five lens elements, the five lens elements being, in order from an object side to an image side along an optical path: a first lens element, a second lens element, a third lens element, a fourth lens element and a fifth lens element, each of the first through fifth lens elements having an object-side surface facing the object side and an image-side surface facing the image side;

wherein the first lens element has negative refractive power, the image-side surface of the first lens element is concave in a paraxial region thereof, the object-side surface of the second lens element is convex in a paraxial region thereof, the image-side surface of the third lens element is concave in a paraxial region thereof, the object-side surface of the fourth lens element is convex in a paraxial region thereof, the object-side surface of the fifth lens element is concave in a paraxial region thereof, and at least one of the object-side surface and the image-side surface of at least one of the first through fifth lens elements has at least one inflection point in an off-axis region thereof;

wherein an f-number of the optical imaging lens assembly is Fno, an Abbe number of the second lens element is V2, an Abbe number of the third lens element is V3, an Abbe number of the fourth lens element is V4, an Abbe number of the fifth lens element is V5, a central thickness of the fourth lens element along the optical path is CT4, an axial distance between the fourth lens element and the fifth lens element is T45, and the following conditions are satisfied:

$$1.5 < Fno < 2.0;$$

$$1.8 < (V2 + V4)/(V3 + V5) < 4.0; \text{ and}$$

$$0.25 < CT4/T45 < 5.5.$$

2. The optical imaging lens assembly of claim 1, wherein the f-number of the optical imaging lens assembly is Fno, and the following condition is satisfied:

$$1.6 < Fno < 1.9.$$

3. The optical imaging lens assembly of claim 2, wherein the f-number of the optical imaging lens assembly is Fno, the Abbe number of the second lens element is V2, the Abbe number of the third lens element is V3, the Abbe number of the fourth lens element is V4, the Abbe number of the fifth lens element is V5, the central thickness of the fourth lens element along the optical path is CT4, the axial distance between the fourth lens element and the fifth lens element is T45, and the following conditions are satisfied:

$$1.69 \le Fno \le 1.88;$$

$$2.35 \le (V2 + V4)/(V3 + V5) \le 3.05;$$

$$1.98 \le V4/V5 \le 3.05;$$

$$2.00 \le (CT4 + CT5)/T45 \le 4.01; \text{ and}$$

$$1.46 \le CT4/T45 \le 2.98.$$

4. The optical imaging lens assembly of claim 1, wherein a central thickness of the first lens element along the optical path is CT1, a central thickness of the second lens element along the optical path is CT2, a central thickness of the third lens element along the optical path is CT3, the central thickness of the fourth lens element along the optical path is CT4, a central thickness of the fifth lens element along the optical path is CT5, and the following condition is satisfied:

$$0.80 < (CT2 + CT4)/(CT1 + CT3 + CT5) < 1.9.$$

5. The optical imaging lens assembly of claim 1, wherein a curvature radius of the image-side surface of the first lens element is R2, a curvature radius of the object-side surface of the second lens element is R3, and the following condition is satisfied:

$$0.75 < R2/R3 < 2.3.$$

6. The optical imaging lens assembly of claim 1, wherein a focal length of the third lens element is f3, a focal length of the fourth lens element is f4, a focal length of the fifth lens element is f5, and the following condition is satisfied:

$$-11 < (f3 + f5)/f4 < -3.2.$$

7. The optical imaging lens assembly of claim 1, wherein the image-side surface of the third lens element has at least one convex critical point in an off-axis region thereof, the fourth lens element has positive refractive power, the image-side surface of the fourth lens element is convex in a paraxial region thereof, a maximum distance between the optically effective area of the object-side surface of the first lens element and the optical axis is Y11, a maximum distance between the optically effective area of the image-side surface of the fifth lens element and the optical axis is Y52, and the following condition is satisfied:

$$0.95 < Y52/Y11 < 1.5.$$

8. An imaging apparatus, comprising the optical imaging lens assembly of claim 1 and an image sensor disposed on an image surface of the optical imaging lens assembly.

9. An electronic device, comprising the imaging apparatus of claim 8.

10. An optical imaging lens assembly comprising five lens elements, the five lens elements being, in order from an object side to an image side along an optical path: a first lens element, a second lens element, a third lens element, a fourth lens element and a fifth lens element, each of the first through fifth lens elements having an object-side surface facing the object side and an image-side surface facing the image side;

wherein the first lens element has negative refractive power, the image-side surface of the first lens element is concave in a paraxial region thereof, the image-side surface of the third lens element is concave in a paraxial region thereof, the object-side surface of the fourth lens element is convex in a paraxial region thereof, the object-side surface of the fifth lens element is concave in a paraxial region thereof, and at least one of the object-side surface and the image-side surface of at least one of the first through fifth lens elements has at least one inflection point in an off-axis region thereof;

wherein an f-number of the optical imaging lens assembly is Fno, an Abbe number of the second lens element is V2, an Abbe number of the third lens element is V3, an Abbe number of the fourth lens element is V4, an Abbe number of the fifth lens element is V5, a central thickness of the fourth lens element along the optical path is CT4, a central thickness of the fifth lens element along the optical path is CT5, an axial distance between the fourth lens element and the fifth lens element is T45, and the following conditions are satisfied:

$$1.5 < Fno < 2.0;$$

$$1.8 < (V2 + V4)/(V3 + V5) < 4.0; \text{ and}$$

$$1.1 < (CT4 + CT5)/T45 < 7.3.$$

11. The optical imaging lens assembly of claim 10, wherein the Abbe number of the second lens element is V2, the Abbe number of the third lens element is V3, the Abbe number of the fourth lens element is V4, the Abbe number of the fifth lens element is V5, and the following condition is satisfied:

$$2.1 < (V2 + V4)/(V3 + V5) < 3.5.$$

12. The optical imaging lens assembly of claim 10, wherein the central thickness of the fourth lens element along the optical path is CT4, the central thickness of the fifth lens element along the optical path is CT5, the axial distance between the fourth lens element and the fifth lens element is T45, and the following condition is satisfied:

$$1.6 < (CT4 + CT5)/T45 < 5.4.$$

13. The optical imaging lens assembly of claim 10, wherein an axial distance between the first lens element and the second lens element is T12, an axial distance between the second lens element and the third lens element is T23, an axial distance between the third lens element and the fourth lens element is T34, the axial distance between the fourth lens element and the fifth lens element is T45, and the following condition is satisfied:

$$4.0 < (T12 + T45)/(T23 + T34) < 15.$$

14. The optical imaging lens assembly of claim 10, wherein the central thickness of the fourth lens element along the optical path is CT4, a curvature radius of the object-side surface of the fourth lens element is R7, a curvature radius of the image-side surface of the fourth lens element is R8, and the following condition is satisfied:

$$|CT4/R7 + CT4/R8| < 0.80.$$

15. The optical imaging lens assembly of claim 10, wherein a curvature radius of the image-side surface of the third lens element is R6, a focal length of the optical imaging lens assembly is f, and the following condition is satisfied:

$$1.1 < R6/f < 7.0.$$

16. The optical imaging lens assembly of claim 10, wherein a composite focal length of the first lens element and the second lens element is f12, a focal length of the optical imaging lens assembly is f, and the following condition is satisfied:

$$1.1 < f12/f < 4.0.$$

17. The optical imaging lens assembly of claim 10, wherein the fifth lens element has negative refractive power, an axial distance between the object-side surface of the first lens element and an image surface is TL, a maximum image height of the optical imaging lens assembly is ImgH, half of a maximum field of view of the optical imaging lens assembly is HFOV, and the following conditions are satisfied:

$$1.6 < TL/ImgH < 2.6; \text{ and}$$
$$49.2 \text{ degrees} < HFOV < 70.3 \text{ degrees}.$$

18. An optical imaging lens assembly comprising five lens elements, the five lens elements being, in order from an object side to an image side along an optical path: a first lens element, a second lens element, a third lens element, a fourth lens element and a fifth lens element, each of the first through fifth lens elements having an object-side surface facing the object side and an image-side surface facing the image side;

wherein the image-side surface of the first lens element is concave in a paraxial region thereof, the second lens element has positive refractive power, the object-side surface of the second lens element is convex in a paraxial region thereof, the third lens element has negative refractive power, the object-side surface of the fourth lens element is convex in a paraxial region thereof, the object-side surface of the fifth lens element is concave in a paraxial region thereof, and at least one of the object-side surface and the image-side surface of at least one of the first through fifth lens elements has at least one inflection point in an off-axis region thereof;

wherein an f-number of the optical imaging lens assembly is Fno, an Abbe number of the fourth lens element is V4, an Abbe number of the fifth lens element is V5, a central thickness of the fourth lens element along the optical path is CT4, an axial distance between the fourth lens element and the fifth lens element is T45, and the following conditions are satisfied:

$$1.5 < Fno < 2.0;$$
$$1.5 < V4/V5 < 4.0; \text{ and}$$
$$0.65 < CT4/T45 < 4.3.$$

19. The optical imaging lens assembly of claim 18, wherein the Abbe number of the fourth lens element is V4, the Abbe number of the fifth lens element is V5, and the following condition is satisfied:

$$1.7 < V4/V5 < 3.5.$$

20. The optical imaging lens assembly of claim 18, wherein the central thickness of the fourth lens element along the optical path is CT4, the axial distance between the fourth lens element and the fifth lens element is T45, and the following condition is satisfied:

$$1.0 < CT4/T45 < 3.2.$$

21. The optical imaging lens assembly of claim 18, wherein a maximum central thickness among those of the first through fifth lens elements along the optical path is CTmax, a minimum central thickness among those of the first through fifth lens elements along the optical path is CTmin, and the following condition is satisfied:

$$2.8 < CT\max/CT\min < 4.3.$$

22. The optical imaging lens assembly of claim 18, further comprising an aperture stop, wherein an axial distance between the object-side surface of the first lens element and an image surface is TL, a focal length of the optical imaging lens assembly is f, a maximum distance between the optically effective area of the image-side surface of the fifth lens element and the optical axis is Y52, a maximum distance between the optically effective area of the aperture stop and the optical axis is YS, and the following conditions are satisfied:

$$1.5 < TL/f < 3.9; \text{ and}$$
$$2.2 < Y52/YS < 3.5.$$

23. The optical imaging lens assembly of claim 18, wherein a curvature radius of the object-side surface of the fifth lens element is R9, a focal length of the optical imaging lens assembly is f, and the following condition is satisfied:

$$-5.0 < R9/f < -0.10.$$

24. The optical imaging lens assembly of claim 18, wherein a focal length of the second lens element is f2, a central thickness of the second lens element along the optical path is CT2, and the following condition is satisfied:

$$2.4 < f2/CT2 < 5.0.$$

25. The optical imaging lens assembly of claim 18, wherein the image-side surface of the second lens element is convex in a paraxial region thereof, a curvature radius of the image-side surface of the second lens element is R4, a central thickness of the second lens element along the optical path is CT2, and the following condition is satisfied:

$$-5.0 < R4/CT2 < -2.0.$$

* * * * *